(12) United States Patent
Takahashi et al.

(10) Patent No.: US 10,873,758 B2
(45) Date of Patent: Dec. 22, 2020

(54) IMAGE PROCESSING DEVICE AND METHOD

(71) Applicant: Sony Corporation, Tokyo (JP)

(72) Inventors: Yoshitomo Takahashi, Kanagawa (JP); Ohji Nakagami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/289,202

(22) Filed: Feb. 28, 2019

(65) Prior Publication Data

US 2019/0200034 A1 Jun. 27, 2019

Related U.S. Application Data

(63) Continuation of application No. 14/433,210, filed as application No. PCT/JP2013/076485 on Sep. 30, 2013, now Pat. No. 10,291,929.

(30) Foreign Application Priority Data

Oct. 9, 2012 (JP) ................ 2012-224625

(51) Int. Cl.
*H04N 19/52* (2014.01)
*H04N 19/597* (2014.01)
(Continued)

(52) U.S. Cl.
CPC ........... *H04N 19/52* (2014.11); *H04N 19/177* (2014.11); *H04N 19/597* (2014.11); *H04N 19/46* (2014.11); *H04N 19/577* (2014.11); *H04N 19/58* (2014.11)

(58) Field of Classification Search
None
See application file for complete search history.

(56) References Cited

U.S. PATENT DOCUMENTS

2009/0310676 A1* 12/2009 Yang ............... H04N 5/455
375/240.12
2010/0135391 A1* 6/2010 Tian ............... H04N 19/597
375/240.12
(Continued)

FOREIGN PATENT DOCUMENTS

| CN | 102340666 A | 2/2012 |
|---|---|---|
| CN | 102638683 A | 8/2012 |
| JP | 2012-023652 A | 2/2012 |

OTHER PUBLICATIONS

International Search Report and Written Opinion and English translation thereof dated Nov. 12, 2013 in connection with Application No. PCT/JP2013/076485.
(Continued)

*Primary Examiner* — Kate H Luo
(74) *Attorney, Agent, or Firm* — Wolf, Greenfield & Sacks, P.C.

(57) ABSTRACT

The present disclosure relates to an image processing device and an image processing method capable of reducing a processing amount.
A selection unit selects a plurality of reference pictures having mutually-different reference picture types from reference pictures represented by reference picture specifying information included in a reference list based on restriction identification information identifying that the reference list that is a list of reference picture specifying information specifying reference pictures of a current picture is used commonly within the current picture. A predicted image generating unit generates a predicted image of the current picture based on a motion vector of a collocated picture of time different from that of the current picture and a reference picture of a same reference picture type as a reference
(Continued)

picture type of the collocated picture among the plurality of reference pictures selected by the selection unit.

7 Claims, 26 Drawing Sheets

(51) Int. Cl.
    *H04N 19/177*     (2014.01)
    *H04N 19/46*     (2014.01)
    *H04N 19/58*     (2014.01)
    *H04N 19/577*     (2014.01)

(56) References Cited

U.S. PATENT DOCUMENTS

| | | | | |
|---|---|---|---|---|
| 2012/0069903 | A1* | 3/2012 | Lim | H04N 19/597 |
| | | | | 375/240.12 |
| 2012/0106634 | A1 | 5/2012 | Jeon et al. | |
| 2013/0114705 | A1* | 5/2013 | Chen | H04N 19/597 |
| | | | | 375/240.12 |
| 2015/0264389 | A1 | 9/2015 | Takahashi et al. | |

OTHER PUBLICATIONS

International Preliminary Report on Patentability and English translation thereof dated Apr. 23, 2015 in connection with Application No. PCT/JP2013/076485.

Extended European Search Report dated Mar. 16, 2016 in connection with European Application No. 13845096.0.

Chinese Office Action and English translation thereof dated May 17, 2017 in connection with Chinese Application No. 201380051783.X.

Japanese Office Action mailed and English translation thereof dated Jun. 22, 2017 in connection with Japanese Application No. 2014-540805.

Chen et al., Temporal motion vector prediction hook for efficient merge mode in MV-HEVC. Joint Collaborative Team on 3D Video Coding Extension Development of ITU-T SG 16 WP 3 and ISO/IEC JTC 1/SC 29/WG 11. 3rd Meeting: Geneva, CH, Article Dated Jan. 17-23, 2013. Document JCT3V-C0064. 12 Pages.

Chen et al., Temporal motion vector prediction hook for MV-HEVC. Joint Collaborative Team on Video Coding (JCT-VC) of ITU-T SG 16 WP 3 and ISO/IEC JTC 1/SC 29/WG 11, 11$^{th}$ Meeting Shanghai, CN Oct. 10-19, 2012, 8 pages.

Hendry et al., AHG 9:On restricted reference picture list. Joint Collaborative Team on Video Coding (JCT-VC) of ITU-T SG 16 WP 3 and ISO/IEC JTC 1/SC 29/WG 11, 11$^{th}$ Meeting Shanghai, CN Oct. 10-19, 2012, 3 pages Kim et al., Restricted usage of motion vectors for long-term reference picture in motion vector prediction process, Joint Collaborative Team on Video Coding (JCT-VC) of ITU-T SG 16 WP 3 and ISO/IEC JTC 1/SC 29/WG 11, 10$^{th}$ Meeting Stockholm, SE Jul. 11-20, 2012, 14 pages.

Sjoberg et al., AHG21:Reference picture list restrictions. Joint Collaborative Team on Video Coding (JCT-VC) of ITU-T SG 16 WP 3 and ISO/IEC JTC 1/SC 29/WG 11, 8$^{th}$ Meeting San Jose, CA Feb. 1-10, 2012, 3 pages.

Takahashi et al., High-level syntax: motion vector prediction issue for long-term reference picture. Joint Collaborative Team on Video Coding (JCT-VC) of ITU-T SG 16 WP 3 and ISO/IEC JTC 1/SC 29/WG 11, 10$^{th}$ Meeting Stockholm, SE Jul. 11-20, 2012, 6 pages.

Tech et al., 3D-HEVC Test Model 1, Joint Collaborative Team on 3D Video Coding Extension Development of ITU-T SG 16 WP 3 and ISO/IEC JTC 1/SC 29/WG 11, 1$^{st}$ Meeting: Stokholm, SE, Jul. 16, 2012, 82 pages.

Ying et al., Temporal motion vector prediction hook for MV-HEVC. Joint Collaborative Team on Video Coding (JCT-VC) of ITU-T SG 16 WP 3 and ISO/IEC JTC 1/SC 29/WG 11, 11$^{th}$ Meeting Shanghai, CN Oct. 10-19, 2012, 8 pages.

Yoshitomo et al., High-level syntax: motion vector prediction issue for long-term reference picture. Joint Collaborative Team on Video Coding (JCT-VC) of ITU-T SG 16 WP 3 and ISO/IEC JTC 1/SC 29/WG 11, 10$^{th}$ Meeting Stockholm, SE Jul. 11-20, 2012, 6 pages.

* cited by examiner

IMAGE PROCESSING DEVICE AND METHOD

CROSS-REFERENCE TO RELATED APPLICATIONS

This application is a continuation of and claims the benefit under 35 U.S.C. § 120 of U.S. patent application Ser. No. 14/433,210, titled "IMAGE PROCESSING DEVICE AND METHOD," filed on Apr. 2, 2015, which is a National Stage of International Application No. PCT/JP2013/076485, filed in the Japanese Patent Office as a Receiving office on Sep. 30, 2013, which claims priority to Japanese Patent Application Number JP2012-224625, filed in the Japanese Patent Office on Oct. 9, 2012, each of which is hereby incorporated by reference in its entirety.

TECHNICAL FIELD

The present disclosure relates to an image processing device and an image processing method, and more particularly, to an image processing device and an image processing method capable of reducing a processing amount.

BACKGROUND ART

Recently, image information is handled as digital data, and, for the purpose of transmission and accumulation of information having high-efficiency at that time, devices that are in compliance with the MPEG (Moving Picture Experts Group) system or the like that performs an orthogonal transform such as a discrete cosine transform and compression using motion compensation, by using the redundancy that is unique to the image information, are widely used for both information delivery in broadcasting stations and the like and information reception in general houses.

Particularly, the MPEG2 (ISO (International Organization for Standardization)/IEC (International Electrotechnical Commission) 13818-2) system is defined as a general-purpose image coding system and is currently used widely for a broad range of applications for the professional use and the consumer use as standards covering both an interlaced scanning image and a sequential scanning image and a standard resolution image and a high definition image. By using the MPEG2 compression system, for example, a code amount (bit rate) of 4 to 8 Mbps in the case of an interlaced scanning image of a standard resolution of 720×480 pixels and a code amount (bit rate) of 18 to 22 Mbps in the case of an interlaced scanning image of high definition of 1920×1088 pixels are allocated, whereby a high compression rate and an improved image quality can be realized.

MPEG2 is targeted for high image quality coding that is mainly suitable for broadcasting but does not respond to a coding system of a code amount (bit rate) lower than that of MPEG1, in other words, a coding system of a higher compression rate. In accordance with the popularization of mobile terminals, the request for such a coding system is predicted to increase in the future, and an MPEG4 coding system has been standardized in response thereto. Relating to the image coding system, a specification has been approved in December, 1998 to be an international standard as ISO/IEC 14496-2.

Furthermore, in recent years, for the initial purpose of image coding for television conferences, H.26L (ITU-T (International Telecommunication Union Telecommunication Standardization Sector) Q6/16 VCEG (Video Coding Expert Group)) has been standardized. It is known that H.26L requires a more calculation amount due to the coding process and the decoding process thereof than that of a conventional coding system such as MPEG2 or MPEG4 and realizes higher coding efficiency. In addition, currently, as part of activities of MPEG4, a standard realizing higher coding efficiency by introducing functions not supported according to H.26L based on H.26L has been made as Joint Model of Enhanced-Compression Video Coding.

As a schedule of the standardization thereof, in March, 2003, an international standard was made based on names of H.264 and MPEG-4 Part 10 (Advanced Video Coding; hereinafter, referred to as AVC).

However, in a case where the macroblock size is set as 16 pixels×16 pixels, there is concern that it is not optimal for a large picture frame of UHD (Ultra High Definition: 4000 pixels×2000 pixels) that becomes a target for a next-generation coding system.

Thus, for the purpose of further improving the coding efficiency to be higher than that of the AVC, standardization of a coding system called HEVC (High Efficiency Video Coding) has been progressed by a JCTVC (Joint Collaboration Team-Video Coding) that is a joint standardization organization of the ITU-T and the ISO/IEC (for example, see Non-Patent Document 1).

In this HEVC coding system, a coding unit (CU) is defined as a processing unit like a macroblock in the AVC. Unlike the macroblock of the AVC, the CU is not fixed to the size of 16×16 pixels but is designated in image compression information in each sequence.

Incidentally, in other to improve the coding of a motion vector using a median prediction defined in the AVC, a method has been considered in which not only a "Spatial Predictor" but also a "Temporal Predictor" and a "Spatio-Temporal Predictor" can be candidates for predicted motion vectors.

In addition, as one of coding systems for motion information, a technique called motion partition merging in which Merge_Flag and Merge_Left_Flag are transmitted has been proposed.

However, only a process within the same viewpoint is presented, and, in the case of multi-viewpoint coding, a vector prediction over viewpoints cannot be made, and there is concern that the coding efficiency decreases.

Thus, various proposals have been made for a TMVP (Temporal motion vector prediction) of merging at the time of multi-viewpoint coding (for example, see Non-Patent Document 2).

In an invention disclosed in Non-Patent Document 2, when a reference picture type of reference picture (reference image) indicated by a reference index 0 of the current block is a Short-term, and a reference picture type of collocated block is a Long-term, a reference index other than "0" indicating a reference picture of which the reference picture type is the Long-term is selected from a list of reference images.

In addition, when a reference picture type of reference picture indicated by the reference index 0 of the current block is a Long-term, and a reference picture type of collocated block is a Short-term, a reference index other than "0" indicating a reference picture of which the reference picture type is the Short-term is selected from the list of reference images.

Accordingly, before coding of the CU (Coding Unit) level is performed, one reference index having a picture type different from the picture type of the reference index 0 needs to be found.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 8", JCTVC-J1003_d7, 2012.7.28

Non-Patent Document 2: Ying Chen, Li Zhang, Vadim Seregin, Marta Karczewicz, "Temporal modion vector prediction hook for MV-HEVC", JCTVC-K0239, 2012.10.10-19

SUMMARY OF THE INVENTION

Problems to be Solved by the Invention

However, since the search processing amount of reference indexes is large, the processing amount is requested to be reduced.

The present disclosure is made in consideration of such situations, and an object thereof is to reduce the processing amount.

Solutions to Problems

According to a first aspect of the present disclosure, there is provided an image processing device including: a selection unit that selects a plurality of reference pictures having mutually-different reference picture types from reference pictures represented by reference picture specifying information included in a reference list based on restriction identification information identifying that the reference list that is a list of reference picture specifying information specifying reference pictures of a current picture is used commonly within the current picture; and a predicted image generating unit that generates a predicted image of the current picture based on a motion vector of a collocated picture of time different from that of the current picture and a reference picture of a same reference picture type as a reference picture type of the collocated picture among the plurality of reference pictures selected by the selection unit.

An image processing method according to a first aspect of the present disclosure corresponds to the image processing device according to the first aspect of the present disclosure.

According to the first aspect of the present disclosure, a plurality of reference pictures having mutually-different reference picture types are selected from reference pictures represented by reference picture specifying information included in a reference list based on restriction identification information identifying that the reference list that is a list of reference picture specifying information specifying reference pictures of a current picture is used commonly within the current picture and a predicted image of the current picture is generated based on a motion vector of a collocated picture of time different from that of the current picture and a reference picture of a same reference picture type as a reference picture type of the collocated picture among the plurality of reference pictures that are selected.

According to a second aspect of the present disclosure, there is provided an image processing device including: a selection unit that selects a plurality of reference pictures having mutually-different reference picture types from reference pictures represented by reference picture specifying information included in a reference list based on change identification information identifying that the reference list that is a list of reference picture specifying information specifying reference pictures of a current picture is changed; and a predicted image generating unit that generates a predicted image of the current picture based on a motion vector of a collocated picture of time different from that of the current picture and a reference picture of a same reference picture type as a reference picture type of the collocated picture among the plurality of reference pictures selected by the selection unit.

An image processing method according to a second aspect of the present disclosure corresponds to the image processing device according to the second aspect of the present disclosure.

According to the second aspect of the present disclosure, a plurality of reference pictures having mutually-different reference picture types are selected from reference pictures represented by reference picture specifying information included in a reference list based on change identification information identifying that the reference list that is a list of reference picture specifying information specifying reference pictures of a current picture is changed, and a predicted image of the current picture is generated based on a motion vector of a collocated picture of time different from that of the current picture and a reference picture of a same reference picture type as a reference picture type of the collocated picture among the plurality of reference pictures that are selected.

Effects of the Invention

According to the present disclosure, an image can be processed. Particularly, the processing amount can be reduced.

MODE FOR CARRYING OUT THE INVENTION

Hereinafter, embodiments for executing the present disclosure (hereinafter, referred to as embodiments) will be described. The description will be presented in the following order.

1. First Embodiment (Image Coding Apparatus/Image Decoding Apparatus)
2. Second Embodiment (Image Coding Apparatus/Image Decoding Apparatus)
3. Third Embodiment (Computer)
4. Fourth Embodiment (Application Example)

1. First Embodiment (Configuration Example of Image Coding Apparatus)

Figure 1:
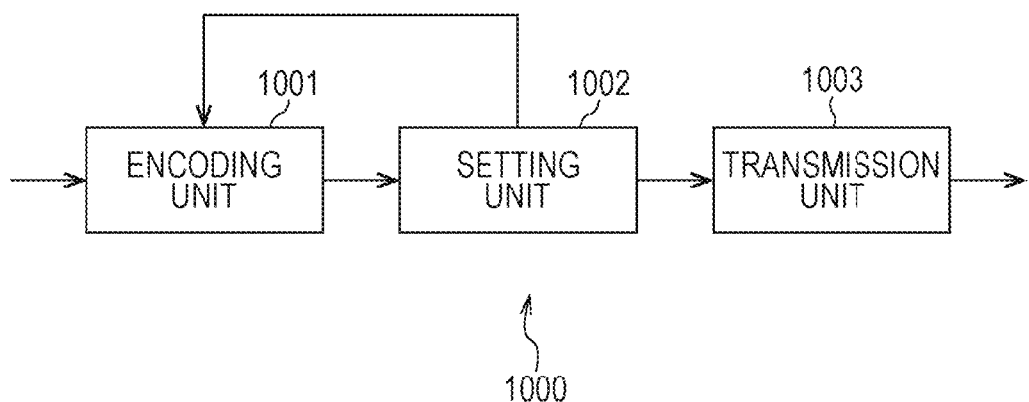
FIG. 1 is a block diagram that illustrates an example of the configuration of an image coding apparatus, to which the present disclosure is applied, according to a first embodiment.

FIG. 1 is a block diagram that illustrates an example of the configuration of an image coding apparatus according to a first embodiment as an image processing device to which the present disclosure is applied.

An image coding apparatus 1000 illustrated in FIG. 1 is configured by an encoding unit 1001, a setting unit 1002, and a transmission unit 1003. The image coding apparatus 1000 performs inter coding according to a motion prediction or a parallax prediction for a multi-viewpoint image configured by images of a plurality of viewpoints (views).

More specifically, the encoding unit 1001 of the image coding apparatus 1000 performs intra coding or inter coding according to the motion prediction or the parallax prediction for the multi-viewpoint image that is input from the outside. When the inter coding process is performed, the encoding unit 1001 refers to restriction identification information (restricted_ref_pic_lists_flag) that is supplied from the setting unit 1002.

The restriction identification information is information used for identifying that reference lists, which are lists of reference image specifying information used for specifying reference images, of all the slices within a picture are restricted to a same reference list. In other words, the restriction identification information is information that is used for identifying that the reference list is used to be common within a picture. The restriction identification information is "1" in the case of representing that the reference lists of all the slices within a picture are restricted to a same reference list and is "0" in the case of representing that the reference lists are not limited to a same reference list.

In a case where the restriction identification information is "1", in the merge mode, the encoding unit 1001 performs a TMVP of merge using a method described in Non-Patent Document 2. The encoding unit 1001 supplies coded data of the multi-viewpoint image to the setting unit 1002.

The setting unit 1002 sets the restriction identification information based on a user input or the like and supplies the set restriction information to the encoding unit 1001. The setting unit 1002 sets parameter sets such as an SPS including the restriction identification information and a PPS (Picture Parameter Set). The setting unit 1002 generates a coded stream by adding the parameter sets to coded data supplied from the encoding unit 1001 and supplies the generated coded stream to the transmission unit 1003.

The transmission unit 1003 transmits the coded stream supplied from the setting unit 1002 to a decoding apparatus to be described later.

(Configuration Example of Coding Unit)

Figure 2:
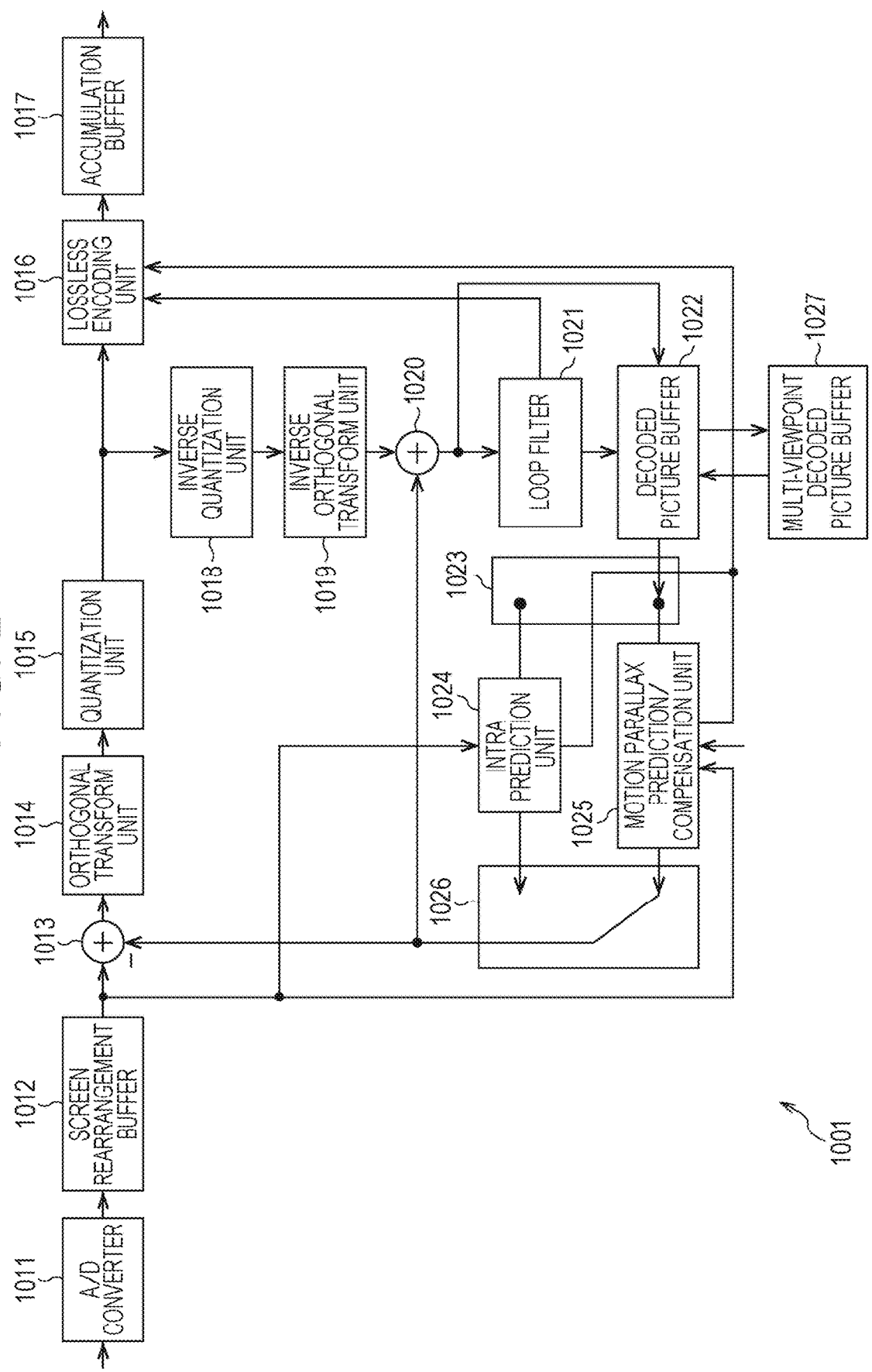
FIG. 2 is a block diagram that illustrates an example of the configuration of a coding unit illustrated in FIG. 1.

FIG. 2 is a block diagram that illustrates an example of the configuration of the encoding unit 1001 illustrated in FIG. 1.

The encoding unit 1001 illustrated in FIG. 2, for example, like a coding system such as the AVC or the HEVC, codes a multi-viewpoint image for each viewpoint using a prediction process.

The encoding unit 1001 illustrated in FIG. 2 includes: an A/D converter 1011; a screen rearrangement buffer 1012; a calculation unit 1013; an orthogonal transform unit 1014; a quantization unit 1015; a lossless encoding unit 1016; and an accumulation buffer 1017. In addition, the encoding unit 1001 includes: an inverse quantization unit 1018; and an inverse orthogonal transform unit 1019; a calculation unit 1020; a loop filter 1021; a decoded picture buffer 1022; a selection unit 1023; an intra prediction unit 1024; a motion parallax prediction/compensation unit 1025; a predicted image selecting unit 1026; and a multi-viewpoint decoded picture buffer 1027.

The A/D converter 1011 performs A/D conversion of an image of one viewpoint that is input and outputs the converted image to the screen rearrangement buffer 1012 so as to be stored therein. The screen rearrangement buffer 1012 rearranges images, which are configured in units of frames and stored in order of display, in order for coding in accordance with a GOP (Group Of Picture) structure. The screen rearrangement buffer 1012 supplies the rearranged images to the calculation unit 1013, the intra prediction unit 1024, and the motion parallax prediction/compensation unit 1025 together with view IDs of the images and POC (Picture Order Count). Here, the view ID is information used for identifying a viewpoint, and the POC is information that is used for identifying time.

The calculation unit 1013 subtracts a predicted image supplied from the intra prediction unit 1024 or the motion parallax prediction/compensation unit 1025 through the predicted image selecting unit 1026 from an image read from the screen rearrangement buffer 1012 and outputs difference information thereof to the orthogonal transform unit 1014.

The orthogonal transform unit 1014 performs an orthogonal transform such as a discrete cosine transform or a Karhuren-Loeve transform for the difference information that is supplied from the calculation unit 1013. Here, a method used for the orthogonal transform is arbitrary. The orthogonal transform unit 1014 supplies orthogonal transform coefficients thereof to the quantization unit 1015.

The quantization unit 1015 quantizes the orthogonal transform coefficients supplied from the orthogonal transform unit 1014. The quantization unit 1015 sets quantization parameters based on information relating to a target value of a coding amount and performs the quantization thereof. Here, a method used for the quantization process is arbitrary. The quantization unit 1015 supplies the quantized orthogonal transform coefficients to the lossless encoding unit 1016.

The lossless encoding unit 1016 performs lossless coding of the orthogonal transform coefficients quantized by the quantization unit 1015 using an arbitrary coding system, thereby generating a coded image. In addition, the lossless encoding unit 1016 acquires intra prediction information including information representing an optimal intra prediction mode and the like from the intra prediction unit 1024. The lossless encoding unit 1016 acquires inter prediction information that includes information representing an optimal inter prediction mode, motion parallax vector information representing a motion vector or a parallax vector, and the like from the motion parallax prediction/compensation unit 1025. In addition, the lossless encoding unit 1016 acquires filter coefficients used for the loop filter 1021 and the like.

The lossless encoding unit 1016 codes such various kinds of information using an arbitrary coding system and configures the coded information as a part of header information of a coded image. The lossless encoding unit 1016 supplies coded data that is configured by a coded image acquired through the coding process and the header information to the accumulation buffer 1017 so as to be stored therein.

Examples of the coding system of the lossless encoding unit 1016 include a variable length coding, arithmetic coding, and the like. As examples of the variable length coding, there are CAVLC (Context-Adaptive Variable Length Coding) defined in the H.264/AVC system and the like. As examples of the arithmetic coding, there is CABAC (Context-Adaptive Binary Arithmetic Coding) or the like.

The accumulation buffer 1017 temporarily stores the coded data supplied from the lossless encoding unit 1016. In addition, the accumulation buffer 1017 supplies the stored coded data to the setting unit 1002 illustrated in FIG. 1 at predetermined timing.

In addition, the orthogonal transform coefficients quantized by the quantization unit 1015 are supplied also to the inverse quantization unit 1018. The inverse quantization unit 1018 performs inverse quantization of the quantized orthogonal transform coefficients by using a method corresponding to the quantization process performed by the quantization unit 1015. The method used for the inverse quantization process may be any method that corresponds to the quantization process performed by the quantization unit 1015. The inverse quantization unit 1018 supplies the acquired orthogonal transform coefficients to the inverse orthogonal transform unit 1019.

The inverse orthogonal transform unit 1019 performs an inverse orthogonal transform of the orthogonal transform coefficients supplied from the inverse quantization unit 1018 by using a method corresponding to the orthogonal transform process performed by the orthogonal transform unit 1014, thereby acquiring difference information that is locally restored. A method used for the inverse orthogonal transform may be any method that corresponds to the orthogonal transform process performed by the orthogonal transform unit 1014. The difference information is supplied to the calculation unit 1020.

The calculation unit 1020 adds a predicted image supplied from the intra prediction unit 1024 or the motion parallax prediction/compensation unit 1025 through the predicted image selecting unit 1026 to the locally restored difference information which is supplied from the inverse orthogonal transform unit 1019. Accordingly, an image (hereinafter, referred to as a reconfigured image) that is locally reconfigured (decoded) is generated. The reconfigured image is supplied to the loop filter 1021 or the decoded picture buffer 1022.

The loop filter 1021 includes a deblocking filter, an adaptive offset filter (SAO (Sample adaptive offset)), an adaptive loop filter (ALF), and the like and appropriately performs a filter process for the reconfigured image supplied from the calculation unit 1020.

For example, the loop filter 1021 removes a block distortion of the reconfigured image by performing a deblocking filter process for the reconfigured image. In addition, for example, the loop filter 1021 performs an adaptive loop filter process using a Wiener filter for a result of the deblocking filter process, thereby improving the image quality.

In addition, the loop filter 1021 may be configured to perform an arbitrary filter process for the reconfigured image. In addition, the loop filter 1021 supplies filter coefficients and the like used for the filter process to the lossless encoding unit 1016.

The loop filter 1021 supplies a result (hereinafter, referred to as a decoded image) of the filter process to the decoded picture buffer 1022.

The decoded picture buffer 1022 stores the reconfigured image supplied from the calculation unit 1020 and the decoded image supplied from the loop filter 1021. In addition, the decoded picture buffer 1022 stores the view ID and the POC of the image.

The decoded picture buffer 1022 supplies the stored reconfigured image and the view ID and the POC of the image to the intra prediction unit 1024 through the selection unit 1023 at predetermined timing or based on a request from an external unit such as the intra prediction unit 1024. In addition, the decoded picture buffer 1022 supplies the decoded image and the view ID and the POC of the image, which are stored, to the motion parallax prediction/compensation unit 1025 through the selection unit 1023 at predetermined timing or based on a request from an external unit such as the motion parallax prediction/compensation unit 1025.

The selection unit 1023 indicates a supply destination of an image that is output from the decoded picture buffer 1022. For example, in the case of the intra prediction, the selection unit 1023 reads a reconfigured image for which the filter process has not been performed from the decoded picture buffer 1022 and supplies the read reconfigured image to the intra prediction unit 1024 as a peripheral image that is an image of a peripheral area located on the periphery of the current prediction process area.

On the other hand, for example, in the case of the inter prediction, the selection unit 1023 reads a decoded image for which the filter process has been performed from the decoded picture buffer 1022 and supplies the read decoded image to the motion parallax prediction/compensation unit 1025 as a reference image.

When the peripheral image is acquired from the decoded picture buffer 1022, the intra prediction unit 1024 performs an intra prediction for generating a predicted image with the prediction unit (PU) being basically set as a processing unit by using a pixel value of the peripheral image. The intra prediction unit 1024 performs the intra prediction in a plurality of intra prediction modes that are prepared in advance.

The intra prediction unit 1024 evaluates a cost function value of each predicted image by using the predicted image of each intra prediction mode and the image supplied from the screen rearrangement buffer 1012 and selects an optimal intra prediction mode. When the optimal intra prediction mode is selected, the intra prediction unit 1024 supplies a predicted image generated in the optimal intra prediction mode and a cost function value to the predicted image selecting unit 1026.

In addition, in a case where the predicted image generated by the intra prediction unit 1024 is selected by the predicted image selecting unit 1026, the intra prediction unit 1024 supplies intra prediction information relating to the optimal intra prediction to the lossless encoding unit 1016.

The motion parallax prediction/compensation unit 1025 performs a motion prediction or a parallax prediction (inter prediction) with the PU being basically set as a processing unit by using the image supplied from the screen rearrangement buffer 1012 and the reference image supplied from the decoded picture buffer 1022.

More specifically, in the case of no merge mode, the motion parallax prediction/compensation unit 1025 detects a motion vector or a parallax vector by using the image supplied from the screen rearrangement buffer 1012 and the reference image. Hereinafter, in a case where the motion vector and the parallax vector do not need to be particularly discriminated from each other, they will be collectively referred to as a motion parallax vector. The motion parallax prediction/compensation unit 1025 generates a predicted image by performing a compensation process for the reference image based on the detected motion parallax vector.

On the other hand, in the case of the merge mode, the motion parallax prediction/compensation unit 1025 performs a TMVP of the merge based on the restriction identification information supplied from the setting unit 1002 illustrated in FIG. 1, thereby generating a predicted image. The motion parallax prediction/compensation unit 1025 performs the inter prediction in a plurality of inter prediction modes prepared in advance.

The motion parallax prediction/compensation unit 1025 evaluates a cost function value of each predicted image by using the predicted image of each inter prediction mode and the image supplied from the screen rearrangement buffer 1012 and selects an optimal inter prediction mode. When the optimal inter prediction mode is selected, the motion parallax prediction/compensation unit 1025 supplies the predicted image generated in the optimal inter prediction mode and the cost function value to the predicted image selecting unit 1026.

In addition, in a case where the predicted image generated by the motion parallax prediction/compensation unit 1025 is selected by the predicted image selecting unit 1026, the motion parallax prediction/compensation unit 1025 supplies the inter prediction information relating to the optimal inter prediction to the lossless encoding unit 1016.

The predicted image selecting unit 1026 selects a supply source of a predicted image supplied to the calculation unit 1013 and the calculation unit 1020 based on the cost function values supplied from the intra prediction unit 1024 and the motion parallax prediction/compensation unit 1025.

For example, in a case where the cost function value supplied from the intra prediction unit 1024 is smaller than the cost function value supplied from the motion parallax prediction/compensation unit 1025, the predicted image selecting unit 1026 selects the intra prediction unit 1024 as a supply source of the predicted image. Then, the predicted image selecting unit 1026 supplies the predicted image supplied from the intra prediction unit 1024 to the calculation unit 1013 and the calculation unit 1020.

On the other hand, in a case where the cost function value supplied from the motion parallax prediction/compensation unit 1025 is smaller than the cost function value supplied from the intra prediction unit 1024, the predicted image selecting unit 1026 selects the motion parallax prediction/compensation unit 1025 as a supply source of the predicted image. Then, the predicted image selecting unit 1026 supplies the predicted image supplied from the motion parallax prediction/compensation unit 1025 to the calculation unit 1013 and the calculation unit 1020.

While the decoded picture buffer 1022 stores only an image of the current processing viewpoint and the view ID and the POC of the image, the multi-viewpoint decoded picture buffer 1027 stores the image of each viewpoint and the view ID and the POC of the image. In other words, the multi-viewpoint decoded picture buffer 1027 acquires the decoded image and the view ID and the POC of the decoded image, which have been supplied to the decoded picture buffer 1022, and stores the decoded image and the view ID and the POC of the decoded image together with the decoded picture buffer 1022.

When the current processing viewpoint is changed, the decoded picture buffer 1022 removes the decoded image of the previous current processing viewpoint, but the multi-viewpoint decoded picture buffer 1027 stores the decoded image as it is. Then, according to a request from the decoded picture buffer 1022 or the like, the multi-viewpoint decoded picture buffer 1027 supplies the decoded image and the view ID and the POC of the image, which are stored, to the decoded picture buffer 1022 as a "decoded image of a viewpoint other than the current processing viewpoint and the view ID and the POC of the decoded image". The decoded picture buffer 1022 supplies the "decoded image of a viewpoint other than the current processing viewpoint and the view ID and the POC of the decoded image" read from the multi-viewpoint decoded picture buffer 1027 to the motion parallax prediction/compensation unit 1025 through the selection unit 1023.

(Configuration Example of Merge Inter Prediction Unit)

Figure 3:
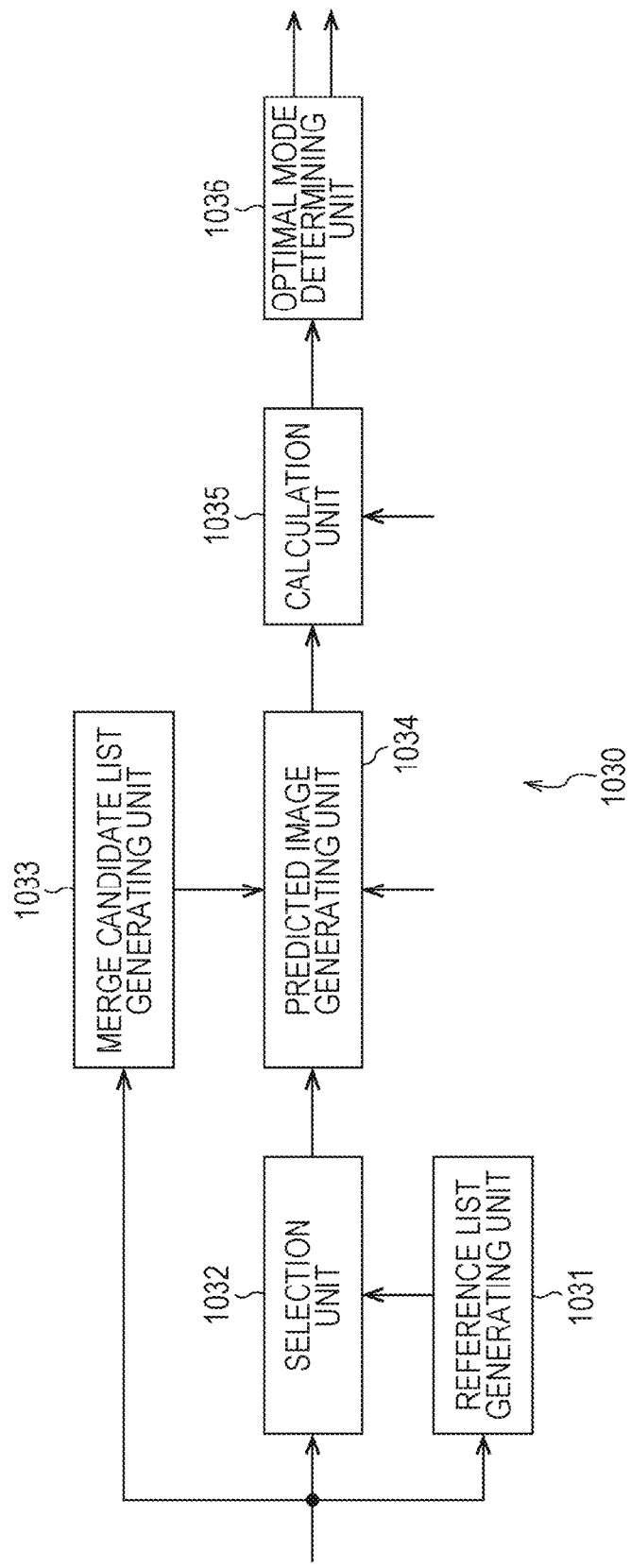
FIG. 3 is a block diagram that illustrates an example of the configuration of a merge inter prediction unit of a motion parallax prediction/compensation unit illustrated in FIG. 2.

FIG. 3 is a block diagram that illustrates an example of the configuration of the merge inter prediction unit 1030 performing an inter prediction in the merge mode that is included in the motion parallax prediction/compensation unit 1025 illustrated in FIG. 2.

The merge inter prediction unit 1030 illustrated in FIG. 3 is configured by: a reference list generating unit 1031; a selection unit 1032; a merge candidate list generating unit 1033; a predicted image generating unit 1034; a calculation unit 1035; and an optimal mode determining unit 1036.

The reference list generating unit 1031 of the merge inter prediction unit 1030 generates a reference list based on the restriction identification information that is supplied from the setting unit 1002 illustrated in FIG. 1.

More specifically, in a case where an inter prediction is performed using an image before or after a current coding image in the display order, in other words, in a case where a unidirectional prediction is performed, the reference list generating unit 1031 generates a reference list L0 in which reference image specifying information specifying the image and an image having a different viewpoint at the same time as that of the current coding image as reference images is registered.

On the other hand, in a case where an inter prediction is performed using images before and after the current coding image in the display order, in other words, in a case where a bidirectional prediction is performed, the reference list generating unit 1031 generates a reference list L0 in which reference image specifying information specifying an image before the current coding image in the display order as a reference image is registered. In addition, in such a case, the reference list generating unit 1031 also generates a reference list L1 in which reference image specifying information specifying an image after the current coding image in the display order as a reference image is registered. Furthermore, in the reference list L0 and the reference list L1, reference image specifying information specifying an image having a different viewpoint at the same time as that of the current coding image as a reference image is also registered.

Such a reference list is generated in units of pictures in a case where the reference image specifying information is "1" and is generated in units of slices in a case where the reference image specifying information is "0".

In each entry of the reference list, a reference index is assigned as information specifying the entry. In an entry of the reference index "0", reference image specifying information of a reference image of the same reference picture type as the reference picture type of the current block that is a current processing prediction block of the current coding image is included.

The reference image specifying information, for example, is information that represents the POC of a reference image in a case where the reference image is an image of the same viewpoint as that of the current coding image and of time different from that of the current coding image and is a view ID of a reference image in a case where the reference image is an image of the same time as that of the current coding image and of a viewpoint different from that of the current coding image.

As such reference picture types, there are two types of a Short-term (short-time reference picture) and a Long-term (long-time reference picture). The Short-term is the type of a reference image of time close to that of the current coding image and of the same viewpoint as that of the current coding image. On the other hand, the Long-term is the type of a reference image of time not close to that of the current coding image and of the same viewpoint as that of the current coding image or a reference image of a viewpoint different from that of the current coding image and of the same time as that of the current coding image.

The reference lists are stored in the reference list generating unit 1031. Information used for generating a reference list, for example, is coded by the lossless encoding unit 1016 illustrated in FIG. 2 and is included in the coded data as a part of the header information.

The selection unit 1032 selects a minimum value of a reference index of a reference picture type different from the reference picture type of the reference index "0" from the reference list stored in the reference list generating unit 1031 based on the restriction identification information supplied from the setting unit 1002. In other words, the selection unit 1032 selects a reference index assigned to an entry including the reference image specifying information of a reference image of the reference picture type different from the reference picture type of the current block that is registered in the reference list. The selection unit 1032 supplies the reference image specifying information of the selected reference index and the reference image specifying information of the reference index "0" to the predicted image generating unit 1034.

The merge candidate list generating unit 1033 generates a merge candidate list based on the restriction identification information supplied from the setting unit 1002. In the merge candidate list, the reference picture type of a collocated block (to be described later in detail) is registered in the entry, and a motion parallax vector of the collocated block is registered in the entry as a candidate for the prediction vector. However, in a case where the reference picture type is the Short-term, the motion parallax vector is processed to be scaled based on a time distance between the reference image and the current coding image or a distance between viewpoints thereof and is regarded as a candidate for the prediction vector.

The collocated block is a prediction block of the same position as that of the current block and of time or a viewpoint that is different from that of the current block. For the simplification of description, here, although only the motion parallax vector of the collocated block is regarded as a candidate for the prediction vector, actually, motion parallax vectors of peripheral prediction blocks of the current block are also regarded as candidates for the prediction vector.

To each entry of the merge candidate list, a vector index used for identifying the entry is assigned. The merge candidate list generating unit 1033 stores the generated merge candidate list.

The predicted image generating unit 1034 reads the merge candidate list from the merge candidate list generating unit 1033. The predicted image generating unit 1034, for each entry of the merge candidate list, generates a predicted image based on the motion parallax vector of the collocated picture and the reference image specified by the reference image specifying information of the same reference picture type as that of the collocated picture that is supplied from the selection unit 1032.

More specifically, in a case where the reference picture type included in the entry is the same as the reference picture type of the current block, the predicted image generating unit 1034 acquires the reference image specifying information of the reference index "0" that is the reference image specifying information of the same reference picture type as that of the current block from the selection unit 1032.

On the other hand, in a case where the reference picture type included in the entry is different from the reference picture type of the current block, the predicted image generating unit 1034 acquires the reference image specifying information of a reference index other than the reference index "0" that is the reference image specifying information of a reference picture type different from that of the current block from the selection unit 1032.

The predicted image generating unit 1034 acquires a reference image that is specified by the acquired reference image specifying information from the decoded picture buffer 1022 through the selection unit 1023. Then, the predicted image generating unit 1034 generates a predicted image by performing a compensation process for the read reference image based on the motion parallax vector that is included in the entry.

In this way, the process of generating a predicted image is performed in each of all the inter prediction modes prepared in advance. In other words, predicted images of the current block that have mutually-different sizes are generated. The predicted image generating unit 1034 supplies the generated predicted images to the calculation unit 1035 together with the inter prediction modes and the vector indexes corresponding thereto.

The calculation unit 1035 calculates a cost function value for each predicted image based on the predicted image, the inter prediction mode, and the vector index supplied from the predicted image generating unit 1034 and an image supplied from the screen rearrangement buffer 1012. The calculation unit 1035 supplies the predicted image and the cost function value, the inter prediction mode, and the vector index corresponding thereto to the optimal mode determining unit 1036.

The optimal mode determining unit 1036 determines the inter prediction mode of a predicted image of which the cost function value supplied from the calculation unit 1035 is minimal as an optimal inter prediction mode. The optimal mode determining unit 1036 supplies the predicted image of the optimal inter prediction mode and the cost function value to the predicted image selecting unit 1026.

In addition, in a case where the predicted image generated by the merge inter prediction unit 1030 is selected by the predicted image selecting unit 1026, the optimal mode determining unit 1036 supplies inter prediction information including information representing the optimal inter prediction mode and the vector index as motion parallax vector information to the lossless encoding unit 1016.

(Description of Process of Image Coding Apparatus)

Figure 4:
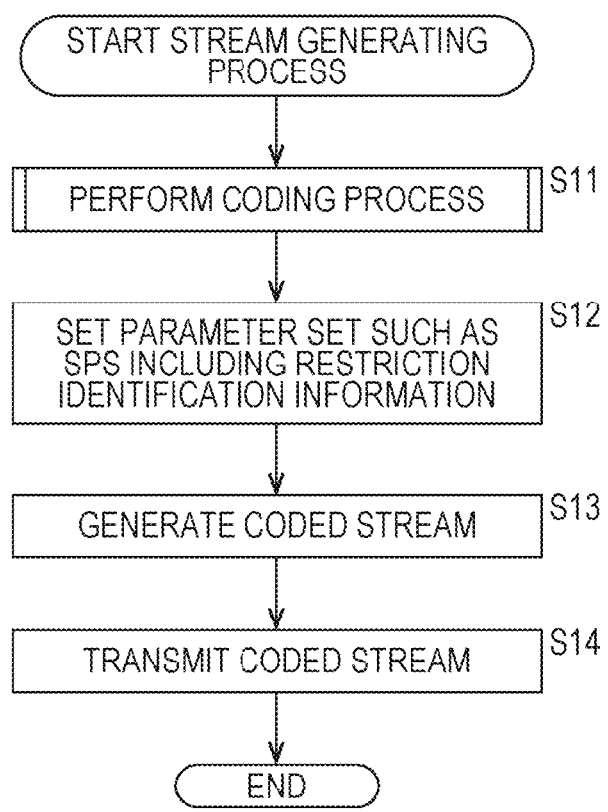
FIG. 4 is a flowchart that illustrates a stream generating process performed by the image coding apparatus illustrated in FIG. 1.

FIG. 4 is a flowchart that illustrates a stream generating process performed by the image coding apparatus 1000 illustrated in FIG. 1. This stream generating process is started when a multi-viewpoint image is input.

In step S11, the encoding unit 1001 of the image coding apparatus 1000 performs a coding process for coding an image of each viewpoint based on the restriction identification information that is set based on a user input and the like supplied from the setting unit 1002. This coding process will be described later in detail with reference to FIG. 5 to be described later.

In step S12, the setting unit 1002 sets parameter sets such as the SPS including the restriction identification information and the PPS. In step S13, the setting unit 1002 generates a coded stream by adding the parameter sets to the coded data supplied from the encoding unit 1001 and supplies the generated coded stream to the transmission unit 1003.

In step S14, the transmission unit 1003 transmits the coded stream supplied from the setting unit 1002 to the decoding apparatus to be described later.

Figure 5:
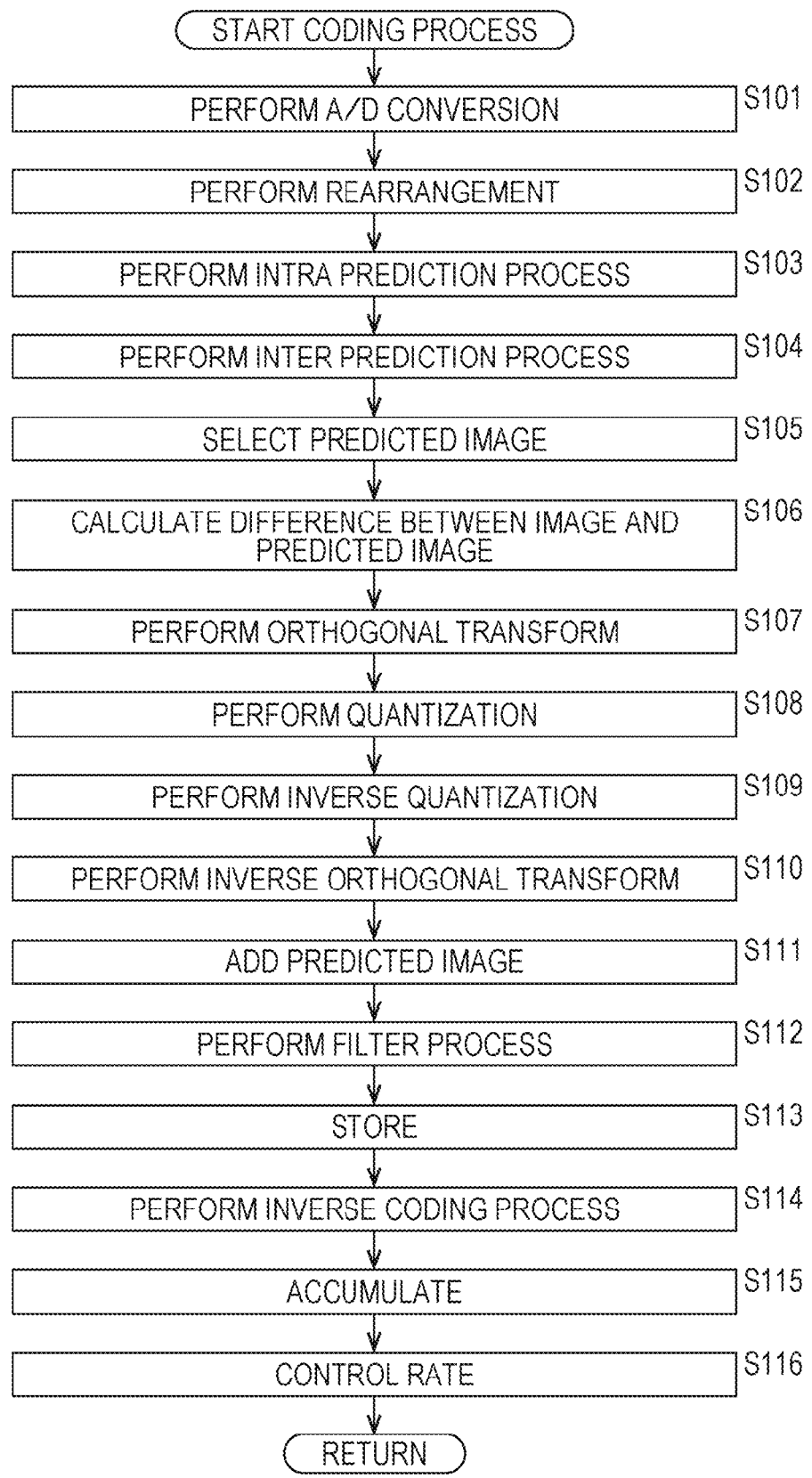
FIG. 5 is a flowchart that illustrates a coding process illustrated in FIG. 4 in detail.

FIG. 5 is a flowchart that illustrates a coding process of step S11 illustrated in FIG. 4 in detail. This coding process is performed for a multi-viewpoint image for each viewpoint.

In step S101, the A/D converter 1011 performs an A/D conversion of an input image. In step S102, the screen rearrangement buffer 1012 stores the A/D-converted image and rearranges the pictures from the display order to the coding order.

In step S103, the intra prediction unit 1024 performs an intra prediction process of a plurality of intra prediction modes prepared in advance, thereby generating predicted images. In addition, the intra prediction unit 1024 calculates a cost function value based on the predicted image and the image supplied from the screen rearrangement buffer 1012 for each intra prediction mode. Then, the intra prediction unit 1024 selects an intra prediction mode of which the cost function value is minimal as an optimal intra prediction mode. The intra prediction unit 1024 supplies the predicted image generated in the optimal intra prediction mode and the cost function value to the predicted image selecting unit 1026.

In step S104, the motion parallax prediction/compensation unit 1025 generates predicted images by performing inter prediction processes of the plurality of inter prediction modes prepared in advance based on the restriction identification information supplied from the setting unit 1002. In addition, the motion parallax prediction/compensation unit 1025 calculates a cost function value based on the predicted image and the image supplied from the screen rearrangement buffer 1012 for each inter prediction mode. Then, the motion parallax prediction/compensation unit 1025 selects an inter prediction mode of which the cost function value is minimal as an optimal inter prediction mode. The motion parallax prediction/compensation unit 1025 supplies the predicted image generated in the optimal inter prediction mode and the cost function value to the predicted image selecting unit 1026.

In step S105, the predicted image selecting unit 1026 selects one of the predicted image supplied from the intra prediction unit 1024 and the predicted image supplied from the motion parallax prediction/compensation unit 1025 that has a smaller cost function value. In a case where the predicted image supplied from the intra prediction unit 1024 is selected, the intra prediction unit 1024 supplies the intra prediction information to the lossless encoding unit 1016. On the other hand, in a case where the predicted image supplied from the motion parallax prediction/compensation unit 1025 is selected, the motion parallax prediction/compensation unit 1025 supplies the inter prediction information to the lossless encoding unit 1016.

In step S106, the calculation unit 1013 calculates a difference between the image rearranged by the process of step S102 and the predicted image selected by the process of step S105. The data amount of the generated difference information is smaller than that of the original image. Accordingly, compared to a case where the image is directly coded, the data amount can be compressed.

In step S107, the orthogonal transform unit 1014 performs an orthogonal transform of the difference information that is generated by the process of step S106. More specifically, an orthogonal transform such as a discrete cosine transform or a Karhuren-Loeve transform is performed, and orthogonal transform coefficients are output. In Step s108, the quantization unit 1015 quantizes the orthogonal transform coefficients acquired by the process of step S107.

Through the process of step S108, the quantized difference information is locally decoded as below. In other words, in step S109, the inverse quantization unit 1018 performs inverse quantization of the quantized orthogonal transform coefficients generated by the process of step S108 according to characteristics corresponding to the characteristics of the quantization unit 1015. In step S110, the inverse orthogonal transform unit 1019 performs an inverse orthogonal transform of the orthogonal transform coefficients acquired by the process of step S109 according to characteristics corresponding to the characteristics of the orthogonal transform unit 1014. In this way, the difference information is restored.

In step S111, the calculation unit 1020 adds the predicted image selected in step S105 to the difference information generated in step S110, thereby generating a reconfigured image.

In step S112, the loop filter 1021 appropriately performs a filter process including a deblocking filter process, an adaptive loop filter process, or the like for the reconfigured image acquired by the process of step S111, thereby generating a decoded image. The loop filter 1021 supplies filter coefficients and the like used for the filter process to the lossless encoding unit 1016.

In step S113, the decoded picture buffer 1022 stores the decoded image and the like generated by the process of step S112 and the reconfigured image and the like generated by the process of step S111. The multi-viewpoint decoded picture buffer 1027 stores the decoded image and the like generated by the process of step S112.

In step S114, the lossless encoding unit 1016 performs lossless coding of the orthogonal transform coefficients quantized by the process of step S108, thereby generating a coded image. In addition, the lossless encoding unit 1016 codes the intra prediction information or the inter prediction information, the filter coefficients, and the like, thereby generating header information. Then, the lossless encoding unit 1016 generates coded data based on the coded image and the header information.

In step S115, the accumulation buffer 1017 accumulates the coded data that is acquired by the process of step S114. The coded data stored in the accumulation buffer 1017 is appropriately read and is supplied to the setting unit 1002 illustrated in FIG. 1.

In step S116, the quantization unit 1015 performs control of the rate of the quantization operation based on the coding amount (generated coding amount) of the coded data accumulated in the accumulation buffer 1017 by the process of step S115 such that an overflow or an underflow does not occur.

When the process of step S116 ends, the process is returned to step S11 illustrated in FIG. 4, and the process of step S12 is performed.

Figure 6:
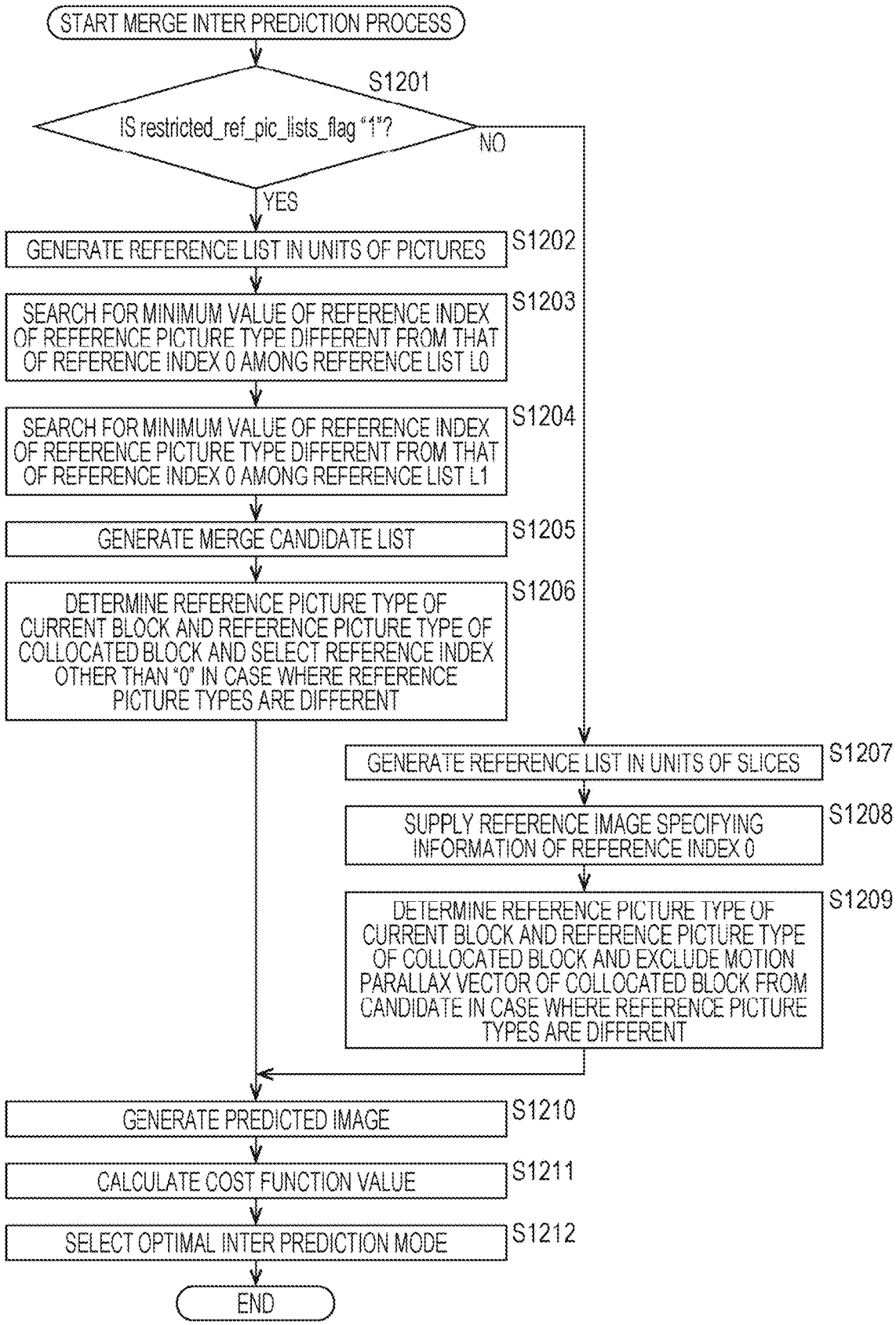
FIG. 6 is a flowchart that illustrates a merge inter prediction process included in an inter prediction process illustrated in FIG. 5.

FIG. 6 is a flowchart that illustrates a merge inter prediction process, which is the inter prediction process of the merge mode, included in the inter prediction process of step S104 illustrated in FIG. 5. This merge inter prediction process is performed in units of pictures in a case where a multi-viewpoint image is coded in the merge mode.

In step S1201, the reference list generating unit 1031 (FIG. 3) of the merge inter prediction unit 1030 determines whether or not the restriction identification information (restricted_ref_pic_lists_flag) supplied from the setting unit 1002 is "1". In a case where the restriction identification information is determined to be "1" in step S1201, the process proceeds to step S1202.

In step S1202, the reference list generating unit 1031 generates and stores a reference list in units of pictures. Information used for generating the reference list, for example, is coded by the lossless encoding unit 1016 illustrated in FIG. 2 and is included in the coded data as a part of the header information.

In step S1203, the selection unit 1032 searches for a minimum value of the reference index of the reference picture type different from the reference picture type of the reference index "0" in the reference list L0 generated by the reference list generating unit 1031.

More specifically, the selection unit 1032 searches the reference list L0 for one or more reference indexes in the ascending order and continues the search until reference image specifying information of a reference image of a reference picture type different from the reference picture type of the reference index "0" is found.

For example, when the reference picture type of the reference index "0" is the Short-term, the selection unit 1032 continues the search for one or more reference indexes in the ascending order until a reference index including reference image specifying information of a reference image of which the reference picture type is the Long-term in the entry is found.

On the other hand, when the reference picture type corresponding to the reference index "0" is the Long-term, the selection unit 1032 continues the search for one or more reference indexes in the ascending order until a reference index including reference image specifying information of a reference image of which the reference picture type is the Short-term in the entry is found. The selection unit 1032 supplies the reference image specifying information included in the entry of the reference index that has been retrieved to the predicted image generating unit 1034.

In step S1204, in a case where the reference list L1 is generated by the reference list generating unit 1031, similarly to the case of the reference list L0, the selection unit 1032 searches for a minimum value of a reference index of a reference picture type different from the reference picture type of the reference index "0" in the reference list L1. The selection unit 1032 supplies the reference image specifying information included in the entry of the retrieved reference index to the predicted image generating unit 1034. In addition, the selection unit 1032 supplies the reference image specifying information included in the entry of the reference index "0" to the predicted image generating unit 1034.

The process of subsequent steps S1205, S1206, and S1209 to S1212 is performed for each prediction block of the inter prediction mode.

In step S1205, the merge candidate list generating unit 1033 generates a merge candidate list registering a corresponding motion parallax vector in the entry as a candidate for a prediction vector together with the reference picture types of all the collocated blocks and stores the generated merge candidate list.

In step S1206, the predicted image generating unit 1034, for each entry of the merge candidate list, determines whether or not the reference picture type of the current block and the reference picture type of the collocated block included in the entry coincide with each other. Then, in a case where the reference picture types are different from each other, the predicted image generating unit 1034 selects reference image specifying information of a reference index other than "0" among the reference image specifying information supplied from the selection unit 1032 as the reference image specifying information of the current block.

On the other hand, in a case where the reference picture types are the same, the predicted image generating unit 1034 selects reference image specifying information of the reference index "0" among the reference image specifying information supplied from the selection unit 1032 as the reference image specifying information of the current block. Then, the process proceeds to step S1210.

On the other hand, in step S1201, in a case where the restriction identification information is determined not to be "1", in other words, in a case where the restriction identification information is "0", the reference list generating unit 1031 generates and stores a reference list in units of slices in step S1207. The information used for generating this reference list, for example, is coded by the lossless encoding unit 1016 and is included in the coded data as a part of the header information.

In step S1208, the selection unit 1032 supplies the reference image specifying information of the reference index "0" of the generated reference list to the predicted image generating unit 1034. The predicted image generating unit 1034 sets the reference image specifying information as the reference image specifying information of the current block.

In step S1209, the merge candidate list generating unit 1033 determines whether or not the reference picture type of the current block and the reference picture type of each collocated block coincide with each other. Then, in a case where the reference picture type of the collocated block is different from the reference picture type of the current block, the merge candidate list generating unit 1033 excludes the motion parallax vector of the collocated block from candidates for the prediction vector and generates and stores a merge candidate list. Then, the process proceeds to step S1210.

In step S1210, the predicted image generating unit 1034 generates a predicted image based on the reference image specified by the reference image specifying information of the current block and the prediction vector included in each entry of the merge candidate list. The predicted image generating unit 1034 supplies the generated predicted image to the calculation unit 1035 together with the inter prediction mode and the vector index corresponding thereto.

In step S1211, the calculation unit 1035 calculates a cost function value for each predicted image based on the predicted image, the inter prediction mode, and the vector index supplied from the predicted image generating unit 1034 and the image supplied from the screen rearrangement buffer 1012. The calculation unit 1035 supplies the predicted image and the cost function value, the inter prediction mode, and the vector index corresponding thereto to the optimal mode determining unit 1036.

In step S1212, the optimal mode determining unit 1036 selects an inter prediction mode of a predicted image of which the cost function value supplied from the calculation unit 1035 is minimal as the optimal inter prediction mode. The optimal mode determining unit 1036 supplies the predicted image of the optimal inter prediction mode and the cost function value to the predicted image selecting unit 1026. Then, the process ends.

(Configuration Example of Image Decoding Apparatus)

Figure 7:
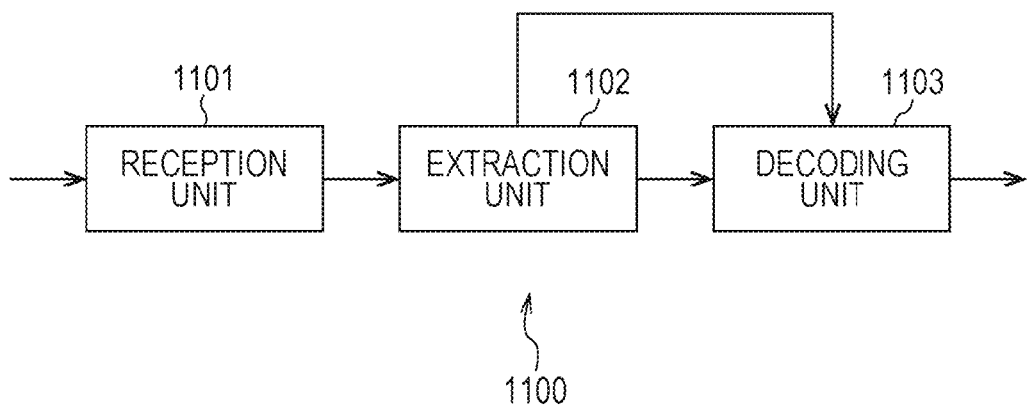
FIG. 7 is a block diagram that illustrates an example of the configuration of an image decoding apparatus, to which the present disclosure is applied, according to the first embodiment.

FIG. 7 is a block diagram that illustrates an example of the configuration of an image decoding apparatus according to the first embodiment, which decodes a coded stream transmitted from the image coding apparatus 1000 illustrated in FIG. 1, as an image processing device to which the present disclosure is applied.

The image decoding apparatus 1100 illustrated in FIG. 7 is configured by: a reception unit 1101; an extraction unit 1102; and a decoding unit 1103.

The reception unit 1101 of the image decoding apparatus 1100 receives a coded stream transmitted from the image coding apparatus 1000 and supplies the received coded stream to the extraction unit 1102.

The extraction unit 1102 extracts parameter sets such as an SPS including the restriction identification information and a PPS and coded data of a multi-viewpoint image from the coded stream supplied from the reception unit 1101 and supplies the parameter sets and the coded data of the multi-viewpoint image to the decoding unit 1103.

The decoding unit 1103 performs intra decoding or inter decoding according to a motion prediction or a parallax prediction for coded data supplied from the extraction unit 1102 using a system corresponding to the image coding apparatus 1000. More specifically, in a case where the restriction identification information included in the SPS supplied from the extraction unit 1102 is "1", in the merge mode, the decoding unit 1103 performs a TMVP of the merge using a method described in Non-Patent Document 2. The decoding unit 1103 outputs a multi-viewpoint image that is acquired as a result of the decoding process.

(Configuration Example of Decoding Unit)

Figure 8:
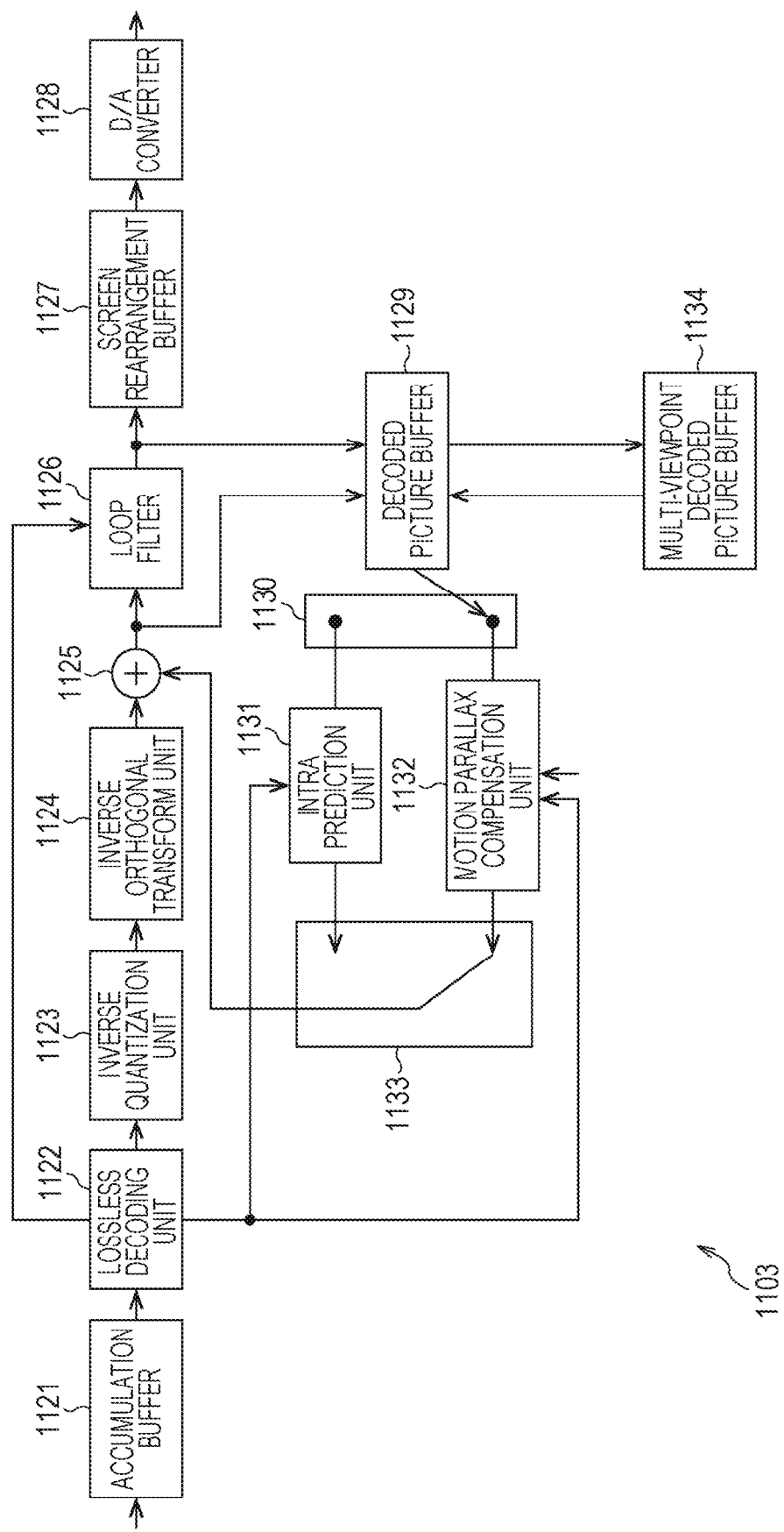
FIG. 8 is a block diagram that illustrates an example of the configuration of a decoding unit illustrated in FIG. 7.

FIG. 8 is a block diagram that illustrates an example of the configuration of the decoding unit 1103 illustrated in FIG. 7.

The decoding unit 1103 illustrated in FIG. 8 decodes a multi-viewpoint image for each viewpoint by using a system corresponding to the encoding unit 1001 illustrated in FIG. 2.

The decoding unit 1103 includes: an accumulation buffer 1121; a lossless decoding unit 1122; an inverse quantization unit 1123; an inverse orthogonal transform unit 1124; a calculation unit 1125; a loop filter 1126; a screen rearrangement buffer 1127; and a D/A converter 1128. In addition, the decoding unit 1103 includes: a decoded picture buffer 1129; a selection unit 1130; an intra prediction unit 1131; a motion parallax compensation unit 1132; a selection unit 1133; and a multi-viewpoint decoded picture buffer 1134.

The accumulation buffer 1121 accumulates the coded data supplied from the extraction unit 1102 illustrated in FIG. 7 and supplies the coded data to the lossless decoding unit 1122 at predetermined timing. The lossless decoding unit 1122 decodes the coded data supplied from the accumulation buffer 1121 by using a system corresponding to the coding system of the lossless encoding unit 1016. The lossless decoding unit 1122 supplies quantized orthogonal transform coefficients acquired by the decoding process to the inverse quantization unit 1123.

In addition, the lossless decoding unit 1122 supplies intra prediction information acquired by decoding the coded data to the intra prediction unit 1131 and supplies the inter prediction information and the like to the motion parallax compensation unit 1132. The lossless decoding unit 1122 supplies filter coefficients and the like acquired by decoding the coded data to the loop filter 1126.

The inverse quantization unit 1123 performs inverse quantization of the quantized orthogonal transform coefficients supplied from the lossless decoding unit 1122 by using a system corresponding to the quantization system of the quantization unit 1015 illustrated in FIG. 2 and supplies the acquired orthogonal transform coefficients to the inverse orthogonal transform unit 1124. The inverse orthogonal transform unit 1124 performs an inverse orthogonal transform of the orthogonal transform coefficients supplied from the inverse quantization unit 1123 by using a system corresponding to the orthogonal transform system of the orthogonal transform unit 1014 illustrated in FIG. 2.

The difference information that is acquired by the inverse orthogonal transform process is supplied to the calculation unit 1125. In addition, a predicted image is supplied to the calculation unit 1125 from the intra prediction unit 1131 or the motion parallax compensation unit 1132 through the selection unit 1133.

The calculation unit 1125 acquires a reconfigured image by adding the difference information and the predicted image together. The calculation unit 1125 supplies the reconfigured image to the loop filter 1126 and the decoded picture buffer 1129.

The loop filter 1126, similarly to the loop filter 1021 illustrated in FIG. 2, performs a filter process for the reconfigured image supplied from the calculation unit 1125 by using the filter coefficients and the like that are supplied from the lossless decoding unit 1122, thereby generating a decoded image.

The loop filter 1126 supplies the decoded image to the screen rearrangement buffer 1127 and the decoded picture buffer 1129.

The screen rearrangement buffer 1127 rearranges the supplied decoded image. In other words, the order of frames rearranged in the coding order by the screen rearrangement buffer 1012 illustrated in FIG. 2 is rearranged in the original display order. The D/A converter 1128 performs a D/A conversion of the decoded image supplied from the screen rearrangement buffer 1127 and outputs the converted decoded image to a display not illustrated in the figure so as to be displayed thereon.

The decoded picture buffer 1129 stores the supplied reconfigured image, the view ID and the POC of the image and the decoded image and the view ID and the POC of the image. In addition, the decoded picture buffer 1129 supplies the reconfigured image and the view ID and the POC of the image, which are stored, to the intra prediction unit 1131 through the selection unit 1130 at predetermined timing or based on an external request from the intra prediction unit 1131 or the like.

In addition, the decoded picture buffer 1129 supplies the decoded image and the view ID and the POC of the image, which are stored, to the motion parallax compensation unit 1132 through the selection unit 1130 at predetermined timing or based on an external request from the motion parallax compensation unit 1132 or the like.

The intra prediction unit 1131 acquires the reconfigured image from the decoded picture buffer 1129 through the selection unit 1130 based on the intra prediction information represented by the intra prediction mode information that is supplied from the lossless decoding unit 1122 and sets the acquired reconfigured image as a predicted image. The intra prediction unit 1131 supplies the predicted image to the calculation unit 1125 through the selection unit 1133.

The motion parallax compensation unit 1132 reads a decoded image as a reference image based on the inter prediction information supplied from the lossless decoding unit 1122 and the restriction identification information supplied from the extraction unit 1102 and performs a compensation process for the read decoded image. The motion parallax compensation unit 1132 supplies a predicted image generated as a result thereof to the calculation unit 1125 through the selection unit 1133.

The selection unit 1133 supplies the predicted image supplied from the intra prediction unit 1131 or the predicted image supplied from the motion parallax compensation unit 1132 to the calculation unit 1125.

While the decoded picture buffer 1129 stores only the image of a current processing viewpoint and the view ID and the POC of the image, the multi-viewpoint decoded picture buffer 1134 stores the image of each viewpoint and the view ID and the POC of the image. In other words, the multi-viewpoint decoded picture buffer 1134 acquires a decoded image supplied to the decoded picture buffer 1129 and the view ID and the POC of the decoded image and stores the decoded image and the view ID and the POC of the decoded image together with the decoded picture buffer 1129.

When the current processing viewpoint is changed, the decoded picture buffer 1129 removes the decoded image, but the multi-viewpoint decoded picture buffer 1134 stores the decoded image as it is. Then, the multi-viewpoint decoded picture buffer 1134 supplies the decoded image and the view ID and the POC of the decoded image, which are stored, to the decoded picture buffer 1129 as a "decoded image of a viewpoint other than the current processing viewpoint" in response to a request from the decoded picture buffer 1129 or the like. The decoded picture buffer 1129 supplies "the decoded image of a viewpoint other than the current processing viewpoint and the view ID and the POC of the decoded image" read from the multi-viewpoint decoded picture buffer 1134 to the motion parallax compensation unit 1132 through the selection unit 1130.

(Configuration Example of Merge Inter Prediction Unit)

Figure 9:
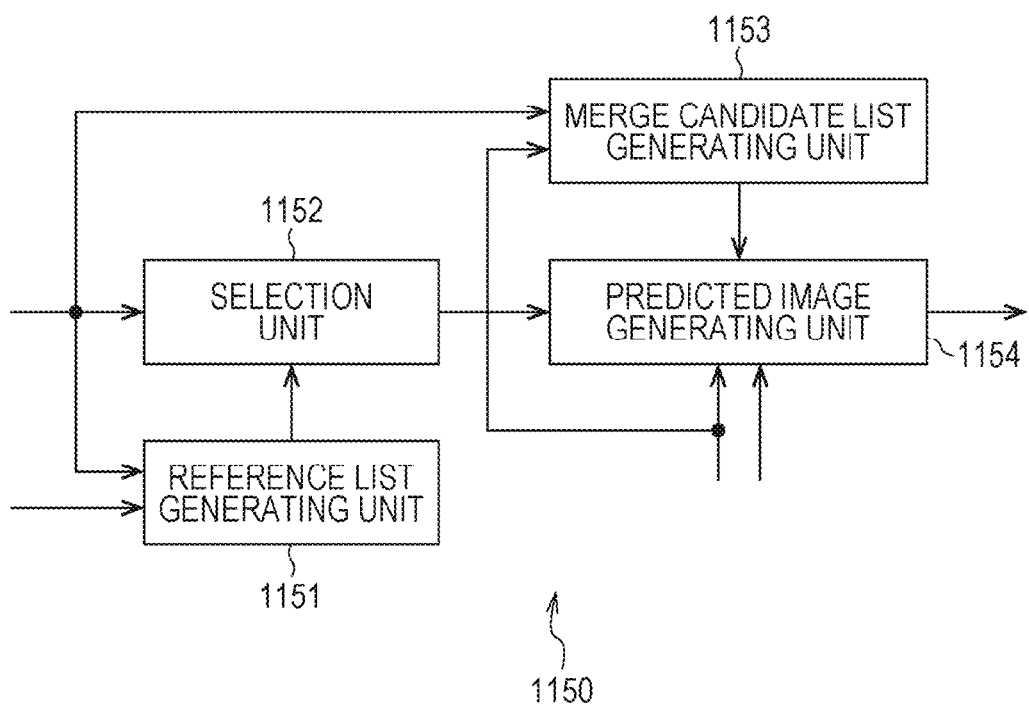
FIG. 9 is a block diagram that illustrates an example of the configuration of a merge inter prediction unit of a motion parallax compensation unit illustrated in FIG. 8.

FIG. 9 is a block diagram that illustrates an example of the configuration of the merge inter prediction unit 1150, which performs an inter prediction in the merge mode, included in the motion parallax compensation unit 1132 illustrated in FIG. 8.

The merge inter prediction unit 1150 illustrated in FIG. 9 is configured by: a reference list generating unit 1151; a selection unit 1152; a merge candidate list generating unit 1153; and a predicted image generating unit 1154.

The reference list generating unit 1151 of the merge inter prediction unit 1150 generates the same reference list as the reference list generated by the reference list generating unit 1031 illustrated in FIG. 3 based on the information for generating the reference list supplied from the lossless decoding unit 1122 and the restriction identification information. The reference list is stored in the reference list generating unit 1151.

The selection unit 1152, similarly to the selection unit 1032 illustrated in FIG. 3, selects a minimum value of the reference index of a reference picture type different from the reference picture type of the reference index "0" from the reference list based on the restriction identification information supplied from the extraction unit 1102. The selection unit 1152 supplies the reference image specifying information of the selected reference index and the reference image specifying information of the reference index "0" to the predicted image generating unit 1154.

The merge candidate list generating unit 1153, similarly to the merge candidate list generating unit 1033 illustrated in FIG. 3, generates a merge candidate list for a prediction block of an inter prediction mode indicated by the inter prediction information supplied from the lossless decoding unit 1122 illustrated in FIG. 8 based on the restriction identification information. The merge candidate list generating unit 1153 stores the generated merge candidate list.

The predicted image generating unit 1154 reads an entry of a vector index included in the inter prediction information from the merge candidate list. In a case where the reference picture type included in the read entry is the same as the reference picture type of the current block, the predicted image generating unit 1154 acquires reference image specifying information of the reference index "0" from the selection unit 1152.

On the other hand, in a case where the reference picture type included in the entry is different from the reference picture type of the current block, the predicted image generating unit 1154 acquires reference image specifying information of a reference index other than the reference index "0" from the selection unit 1152. The predicted image generating unit 1154 acquires a reference image that is specified by the acquired reference image specifying information from the decoded picture buffer 1022 through the selection unit 1130.

The predicted image generating unit 1154 generates a predicted image by performing a compensation process for the read reference image based on the motion parallax vector included in the entry. The predicted image generating unit 1154 supplies the generated predicted image to the selection unit 1133.

(Description of Process of Image Decoding Apparatus)

Figure 10:
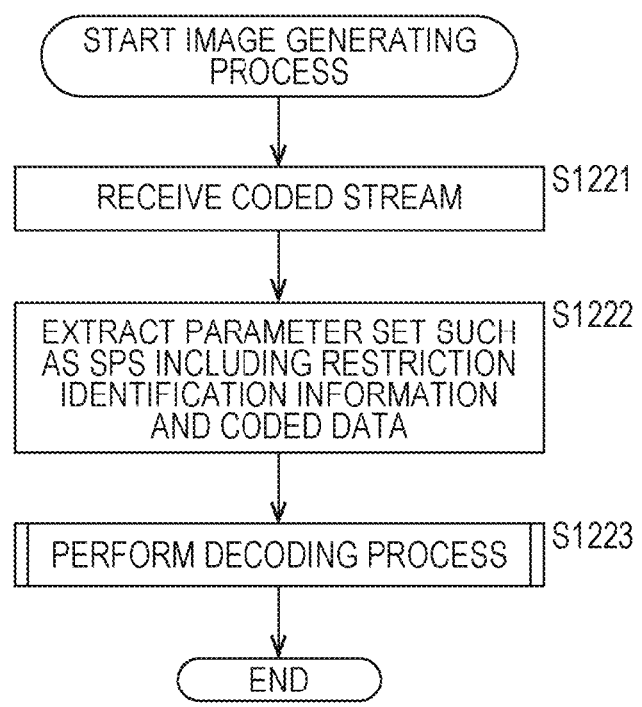
FIG. 10 is a flowchart that illustrates an image generating process performed by the image decoding apparatus illustrated in FIG. 7.

FIG. 10 is a flowchart that illustrates an image generating process performed by the image decoding apparatus 1100 illustrated in FIG. 7. This image generating process, for example, is started when a coded stream is transmitted from the image coding apparatus 1000.

In step S1221, the reception unit 1101 of the image decoding apparatus 1100 receives a coded stream transmitted from the image coding apparatus 1000 and supplies the received coded stream to the extraction unit 1102.

In step S1222, the extraction unit 1102 extracts parameter sets such as an SPS including the restriction identification information and a PPS and coded data from the coded stream that is supplied from the reception unit 1101 and supplies the parameter sets and the coded data to the decoding unit 1103.

In step S1223, the decoding unit 1103 performs a decoding process of the coded data supplied from the extraction unit 1102 for each viewpoint by using a system corresponding to the image coding apparatus 1000. This decoding process will be described in detail with reference to FIG. 11 to be described later. After the process of step S1223, the process ends.

Figure 11:
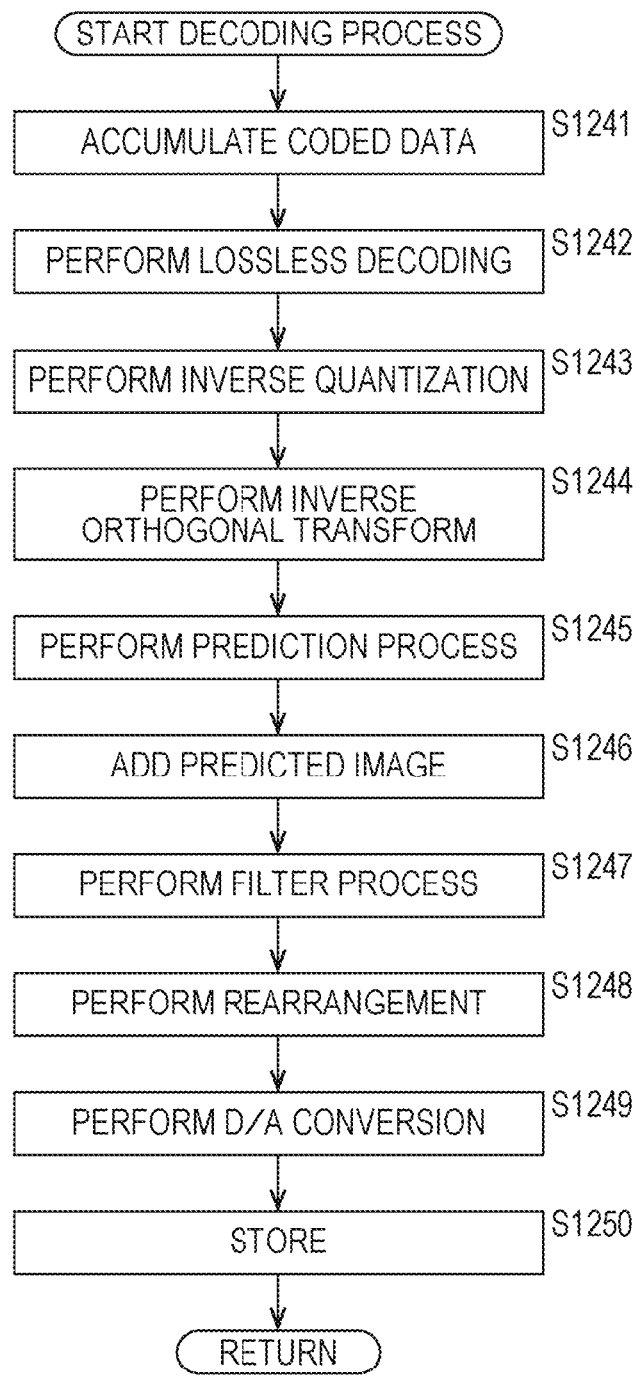
FIG. 11 is a flowchart that illustrates a decoding process illustrated in FIG. 10 in detail.

FIG. 11 is a flowchart that illustrates the decoding process of step S1223 illustrated in FIG. 10 in detail. This decoding process is performed for coded data of a multi-viewpoint image for each viewpoint.

In step S1241, the accumulation buffer 1121 accumulates the coded data supplied from the extraction unit 1102. In step S1242, the lossless decoding unit 1122 performs lossless decoding of the coded data supplied from the accumulation buffer 1121. The lossless decoding unit 1122 supplies quantized orthogonal transform coefficients acquired through the decoding process to the inverse quantization unit 1123.

In addition, the lossless decoding unit 1122 supplies intra prediction information acquired by decoding the coded data to the intra prediction unit 1131 and supplies the inter prediction information and the like to the motion parallax compensation unit 1132. The lossless decoding unit 1122 supplies the filter coefficients and the like acquired by decoding the coded data to the loop filter 1126.

In step S1243, the inverse quantization unit 1123 performs an inverse transform of the quantized orthogonal transform coefficients supplied from the lossless decoding unit 1122 by using a system corresponding to the quantization system of the quantization unit 1015 illustrated in FIG. 2 and supplies acquired orthogonal transform coefficients to the inverse orthogonal transform unit 1124.

In step S1244, the inverse orthogonal transform unit 1124 performs an inverse orthogonal transform of the orthogonal transform coefficients supplied from the inverse quantization unit 1123 by using a system corresponding to the orthogonal transform system of the orthogonal transform unit 1014 illustrated in FIG. 2. The inverse orthogonal transform unit 1124 acquires difference information through the inverse orthogonal transform and supplies the acquired difference information to the calculation unit 1125.

In step S1245, when the intra prediction information is supplied from the lossless decoding unit 1122, the intra prediction unit 1131 performs an intra prediction process based on the intra prediction information. In addition, when the inter prediction information is supplied from the lossless decoding unit 1122, the motion parallax compensation unit 1132 performs an inter prediction process based on the inter prediction information and the restriction identification information supplied from the extraction unit 1102. A predicted image acquired as a result of the intra prediction process or the inter prediction process is supplied to the calculation unit 1125 through the selection unit 1133.

In step S1246, the calculation unit 1125 adds the difference information and the predicted image together, thereby generating a reconfigured image.

In step S1247, the loop filter 1126 performs a filter process for the reconfigured image generated by the calculation unit 1125 by using the filter coefficients and the like supplied from the lossless decoding unit 1122. Accordingly, a decoded image is generated.

In step S1248, the screen rearrangement buffer 1127 rearranges the decoded image generated by the loop filter 1126. In other words, the order of frames rearranged for coding by the screen rearrangement buffer 1012 of the encoding unit 1001 is rearranged in the original display order.

In step S1249, the D/A converter 1128 performs a D/A conversion of the decoded image that has been rearranged by the screen rearrangement buffer 1127. This decoded image is output to a display not illustrated in the figure so as to be displayed thereon.

In step S1250, the decoded picture buffer 1129 and the multi-viewpoint decoded picture buffer 1134 store the decoded image generated by the loop filter 1126 and the like. This decoded image is used as a reference image for the inter prediction process. In addition, the decoded picture buffer 1129 stores the reconfigured image generated by the calculation unit 1125 and the like. This reconfigured image is used as a peripheral image for the intra prediction process.

When the process of step S1250 ends, the process is retuned to step S1223 illustrated in FIG. 10, and the process ends.

Figure 12:
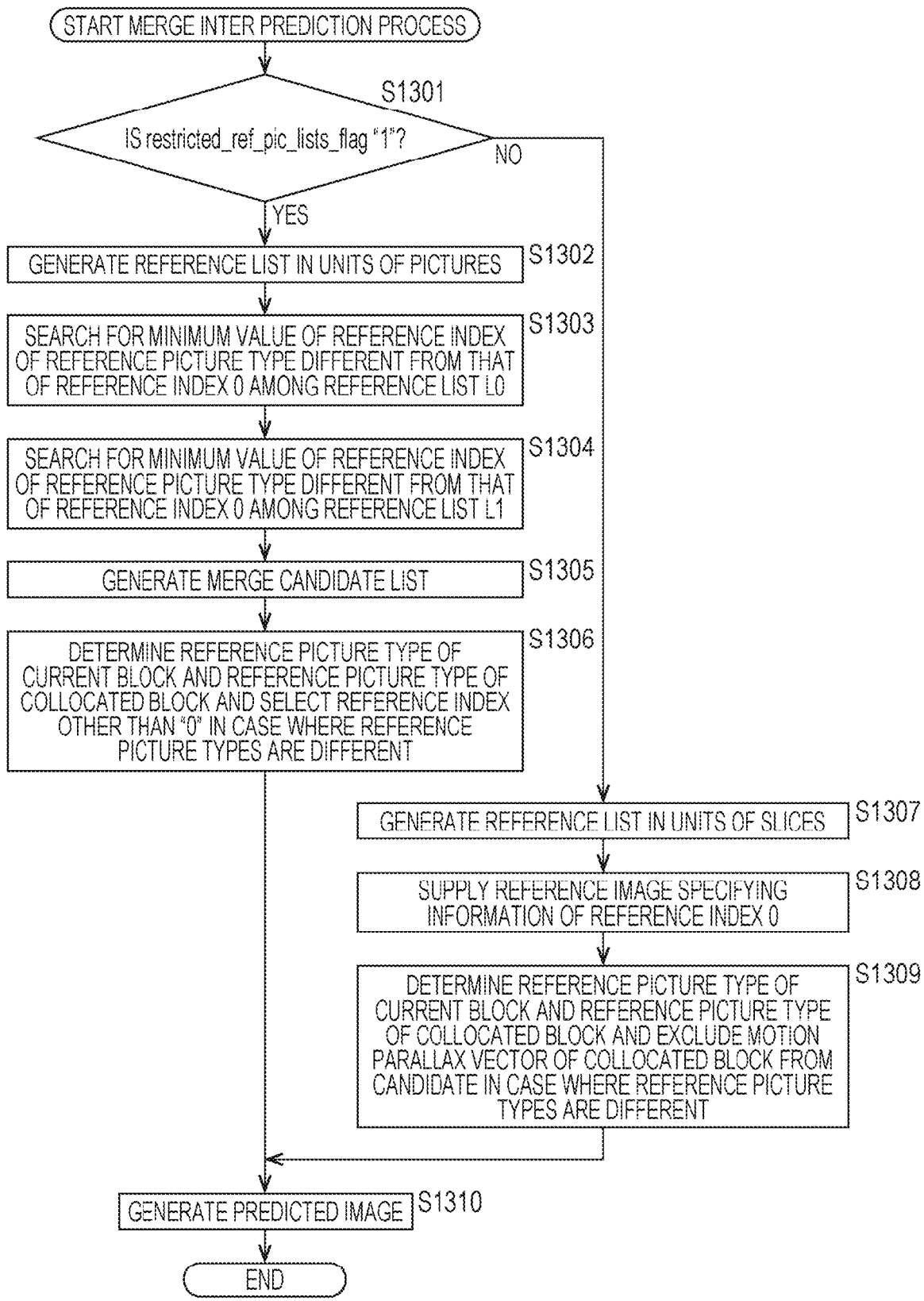
FIG. 12 is a flowchart that illustrates a merge inter prediction process included in a prediction process illustrated in FIG. 11.

FIG. 12 is a flowchart that illustrates the merge inter prediction process, which is the inter prediction process of the merge mode, included in the prediction process of step S1245 illustrated in FIG. 11. This merge inter prediction process is performed in units of pictures in a case where a multi-viewpoint image is decoded in the merge mode.

In step S1301 illustrated in FIG. 12, the reference list generating unit 1151 (FIG. 9) of the merge inter prediction unit 1150 determines whether or not the restriction identification information (restricted_ref_pic_lists_flag) supplied from the extraction unit 1102 is "1". In a case where the restriction identification information is determined to be "1" in step S1301, the process proceeds to step S1302.

In step S1302, the reference list generating unit 1151 generates and stores a reference list in units of pictures based on the information for generating the reference list that is supplied from the lossless decoding unit 1122.

In step S1303, the selection unit 1152 searches for a minimum value of the reference index of the reference picture type different from the reference picture type of the reference index "0" in the reference list L0 generated by the reference list generating unit 1151.

In step S1304, in a case where the reference list L1 is generated by the reference list generating unit 1031, similarly to the case of the reference list L0, the selection unit 1152 searches for a minimum value of the reference index of a reference picture type different from the reference picture type of the reference index "0" in the reference list L1.

The subsequent process of steps S1305, S1306, S1309, and S1310 is performed in units of prediction blocks of the optimal inter prediction mode that is indicated by the inter prediction information.

In step S1305, the merge candidate list generating unit 1153 generates a merge candidate list registering a corresponding motion parallax vector in the entry as a candidate for a prediction vector together with the reference picture types of all the collocated blocks and stores the generated merge candidate list.

In step S1306, the predicted image generating unit 1154 determines whether or not the reference picture type of the current block and the reference picture type of the collocated block included in the entry of the merge candidate list of the vector index included in the inter prediction information coincide with each other. Then, in a case where the reference picture types are different from each other, the predicted image generating unit 1034 selects reference image specifying information of a reference index other than "0" among the reference image specifying information supplied from the selection unit 1152 as the reference image specifying information of the current block.

On the other hand, in a case where the reference picture types are the same, the predicted image generating unit 1154 selects reference image specifying information of the reference index "0" among the reference image specifying information supplied from the selection unit 1152 as the reference image specifying information of the current block.

Then, the process proceeds to step S1310.

On the other hand, in step S1301, in a case where the restriction identification information is determined not to be "1", in other words, in a case where the restriction identification information is "0", in step S1307, the reference list generating unit 1151 generates and stores a reference list in units of slices based on the information for generating the reference list supplied from the lossless decoding unit 1122.

In step S1308, the selection unit 1152 supplies the reference image specifying information of the reference index "0" of the generated reference list to the predicted image generating unit 1154. The predicted image generating unit 1154 sets the reference image specifying information as the reference image specifying information of the current block.

In step S1309, the merge candidate list generating unit 1153 determines whether or not the reference picture type of the current block and the reference picture type of each collocated block coincide with each other. Then, in a case where the reference picture type of the collocated block is different from the reference picture type of the current block, the merge candidate list generating unit 1153 excludes the motion parallax vector of the collocated block from candidates for the prediction vector and generates and stores a merge candidate list. Then, the process proceeds to step S1310.

In step S1310, the predicted image generating unit 1154 generates a predicted image based on the reference image specified by the reference image specifying information of the current block and the prediction vector included in the entry of the merge candidate list of the vector index included in the inter prediction information. Then, the process ends.

In the invention disclosed in Non-Patent Document 2, a search is performed for a minimal reference index of a reference picture type different from the reference picture type of the reference index "0" in units of slices. In the HEVC standard, as slices, a picture can be divided into a maximum of up to 600 slices. In addition, as the number of reference indexes, a maximum of 16 reference indexes can be assigned in each list. Thus, the number of times of performing a search in the search process of Non-Patent Document 2, in the worst case, is 600 (the number of slices)×[15 (the number "16" of reference indexes of L0−1 (since the search is performed from an index "1"))+15 ((the number "16" of reference indexes of L1−1 (since the search is performed from the index "1")))]=18,000 number of times.

In contrast to this, in the first embodiment, only in a case where the restriction identification information is "1", a search for a minimal reference index of a reference picture type different from the reference picture type of the reference index "0" is performed in units of pictures. Accordingly, the number of times of performing a search in the worst case can be decreased to be 30 times that is 1/600 times of the above-described number of times.

2. Second Embodiment (Configuration Example of Image Coding Apparatus)

Figure 13:
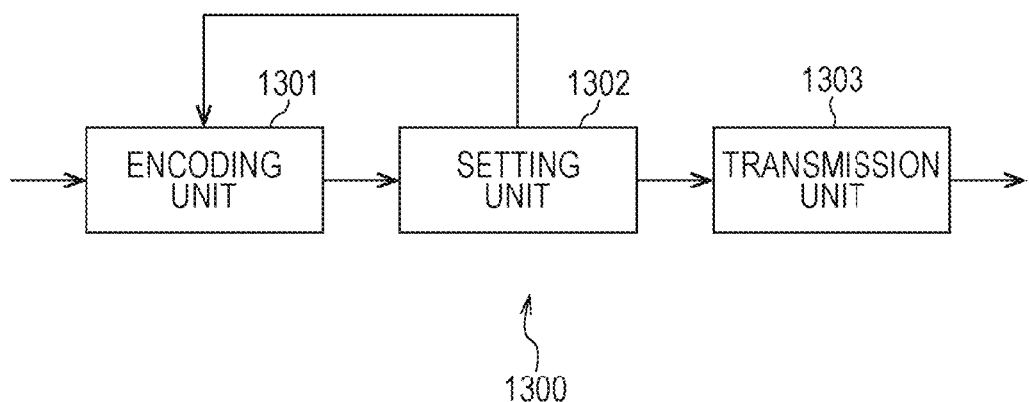
FIG. 13 is a block diagram that illustrates an example of the configuration of an image coding apparatus, to which the present disclosure is applied, according to a second embodiment.

FIG. 13 is a block diagram that illustrates an example of the configuration of an image coding apparatus according to a second embodiment as an image processing device to which the present disclosure is applied.

The image coding apparatus 1300 illustrated in FIG. 13 is configured by: a coding unit 1301; a setting unit 1302; and a transmission unit 1303. The image coding apparatus 1300 performs a search for a minimal reference index of a reference picture type different from the reference picture type of the reference index "0" based on change identification information (lists_modification_present_flag) identifying a change in the reference list.

More specifically, the coding unit 1301 of the image coding apparatus 1300 performs intra coding or inter coding according to the motion prediction or the parallax prediction for the multi-viewpoint image that is input from the outside. When the inter coding process is performed, the coding unit 1301 refers to the change identification information that is supplied from the setting unit 1302.

Described in more detail, in a case where the change identification information is "1" indicating that the reference list has been changed, the coding unit 1301 performs a TMVP of merge by using a method described in Non-Patent Document 2 in the merge mode. In other words, the coding unit 1301 performs a search for a minimum value of the reference index of a reference picture type different from the reference picture type of the reference index "0".

In a case where the change identification information is "0" indicating that the reference list has not been changed, the coding unit 1301 does not perform a search for a minimum value of the reference index but sets a predetermined reference index as the reference index of the reference picture type different from the reference picture type of the reference index "0" in the merge mode. The coding unit 1301 supplies coded data acquired as a result of the coding process to the setting unit 1302.

The setting unit 1302 sets the change identification information, an RPS (Reference Picture Set) including the number of Short-term pictures, the number of Long-term pictures, the number of reference images, and the like based on a user input or the like and supplies them to the coding unit 1301. Here, a Short-term picture is a reference image of which the reference picture type is the Short-term, and a Long-term picture is a reference image of which the reference picture type is the Long-term.

The setting unit 1302 sets the number of Long-term pictures, the SPS including the number of reference images and the like, the PPS including the change identification information, and the like. The setting unit 1302 generates a coded stream by adding the parameter set such as the SPS, the PPS, or the RPS to the coded data supplied from the coding unit 1301 and supplies the generated coded stream to the transmission unit 1303.

The transmission unit 1303 transmits the coded stream supplied from the setting unit 1302 to the decoding apparatus to be described later.

(Configuration Example of Coding Unit)

The configuration of the coding unit 1301 illustrated in FIG. 13 is the same as that of the encoding unit 1001 illustrated in FIG. 2 except for the merge inter prediction unit of the motion parallax prediction/compensation unit 1025. Thus, here, only the configuration of the merge inter prediction unit of the coding unit 1301 will be described.

(Configuration Example of Merge Inter Prediction Unit)

Figure 14:
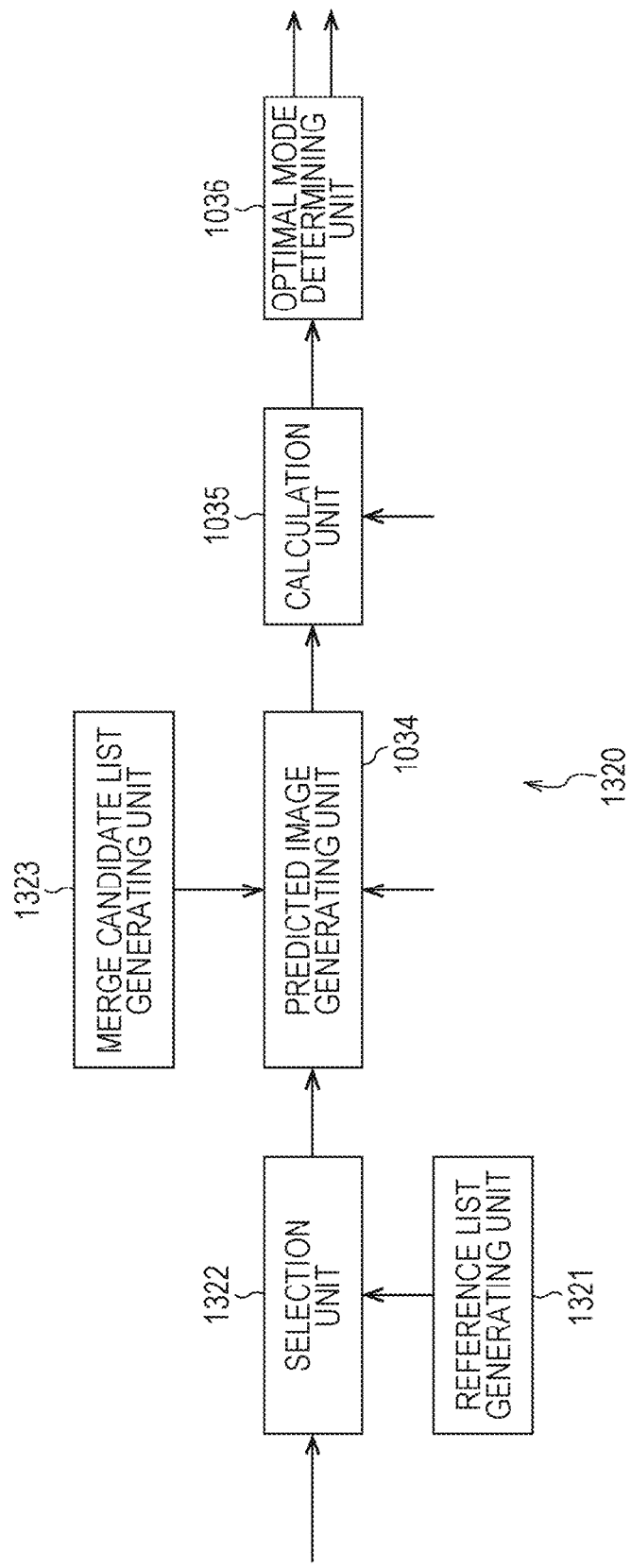
FIG. 14 is a block diagram that illustrates the configuration of a merge inter prediction unit of a coding unit illustrated in FIG. 13.

FIG. 14 is a block diagram that illustrates the configuration of the merge inter prediction unit 1320 of the coding unit 1301 illustrated in FIG. 13.

Among the configuration illustrated in FIG. 14, the same reference numeral is assigned to the same configuration as that illustrated in FIG. 3, and duplicate description will not be presented as is appropriate.

In the configuration of the merge inter prediction unit 1320 illustrated in FIG. 14, a reference list generating unit 1321, a selection unit 1322, and a merge candidate list generating unit 1323 are disposed instead of the reference list generating unit 1031, the selection unit 1032, and the merge candidate list generating unit 1033, which is different from the configuration of the merge inter prediction unit 1030 illustrated in FIG. 3.

The reference list generating unit 1321 of the merge inter prediction unit 1320 generates a reference list in units of slices and stores the reference list. As a method of generating the reference list, a method similar to that of the reference list generating unit 1031 may be used.

The selection unit 1322 detects reference image specifying information of the reference index "0" from the reference list stored in the reference list generating unit 1321 and supplies the detected reference image specifying information to the predicted image generating unit 1034. In addition, in a case where the change identification information supplied from the setting unit 1302 is "1", the selection unit 1322 selects a minimum value of the reference index of a reference picture type different from the reference picture type of the reference index "0" from the reference list. The selection unit 1032 supplies the reference image specifying information of the reference index to the predicted image generating unit 1034.

On the other hand, in a case where the change identification information is "0", the selection unit 1322 selects a minimum value of the reference index corresponding to a reference picture type different from the reference index "0" based on the RPS, the number of Long-term pictures, the number of reference images, and the like supplied from the setting unit 1302. The selection unit 1032 detects the reference image specifying information of the reference index from the reference list and supplies the detected reference image specifying information to the predicted image generating unit 1034.

The merge candidate list generating unit 1323 generates a merge candidate list for registering a corresponding motion parallax vector in the entry as a candidate for the prediction vector together with the reference picture types of all the collocated blocks. The merge candidate list generating unit 1033 stores the generated merge candidate list.

(Description of Image Coding Apparatus)

Figure 15:
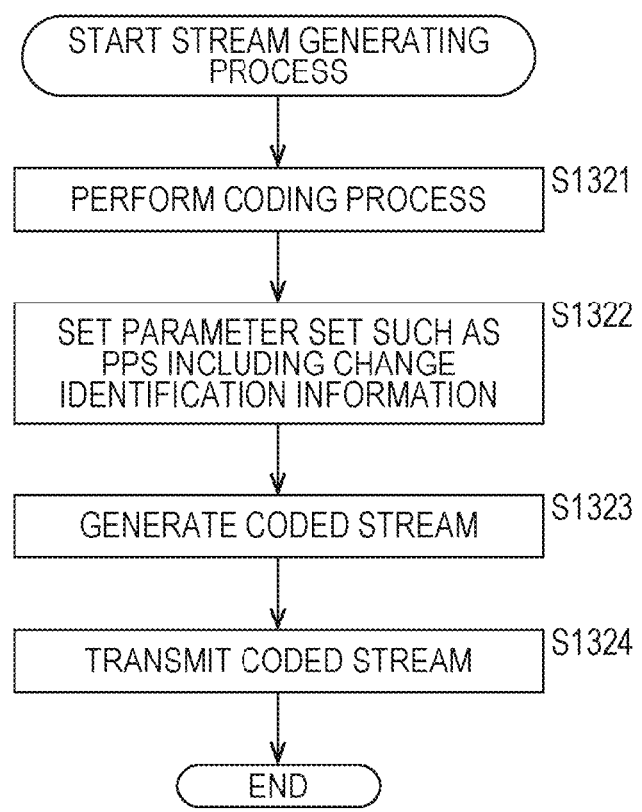
FIG. 15 is a flowchart that illustrates a stream generating process performed by the image coding apparatus illustrated in FIG. 13.

FIG. 15 is a flowchart that illustrates a stream generating process performed by the image coding apparatus 1300 illustrated in FIG. 13. This stream generating process is started when a multi-viewpoint image is input.

In step S1321, the coding unit 1301 of the image coding apparatus 1300 performs a coding process for coding an image of each viewpoint based on the change identification information that is supplied from the setting unit 1302. This coding process will be described later in detail.

In step S1322, the setting unit 1302 sets the change identification information based on a user input or the like and supplies the set change identification information to the coding unit 1301 and sets the PPS including the change identification information. In addition, the setting unit 1302 sets the number of Long-term pictures and the number of reference images and supplies the set numbers to the coding unit 1301 and sets the SPS including the number of Long-term pictures, the number of reference images, and the like. In addition, the setting unit 1302 sets the RPS including the number of Short-term pictures and supplies the set RPS to the coding unit 1301.

In step S1323, the setting unit 1302 generates a coded stream by adding parameter sets such as the SPS, the PPS, and the RPS to the coded data supplied from the coding unit 1301 and supplies the generated coded stream to the transmission unit 1303.

In step S1324, the transmission unit 1303 transmits the coded stream supplied from the setting unit 1302 to the decoding apparatus to be described later, and the process ends.

The coding process of step S1321 illustrated in FIG. 15 is similar to the coding process illustrated in FIG. 5 except for the merge inter prediction process. Thus, hereinafter, only the merge inter prediction process will be described.

Figure 16:
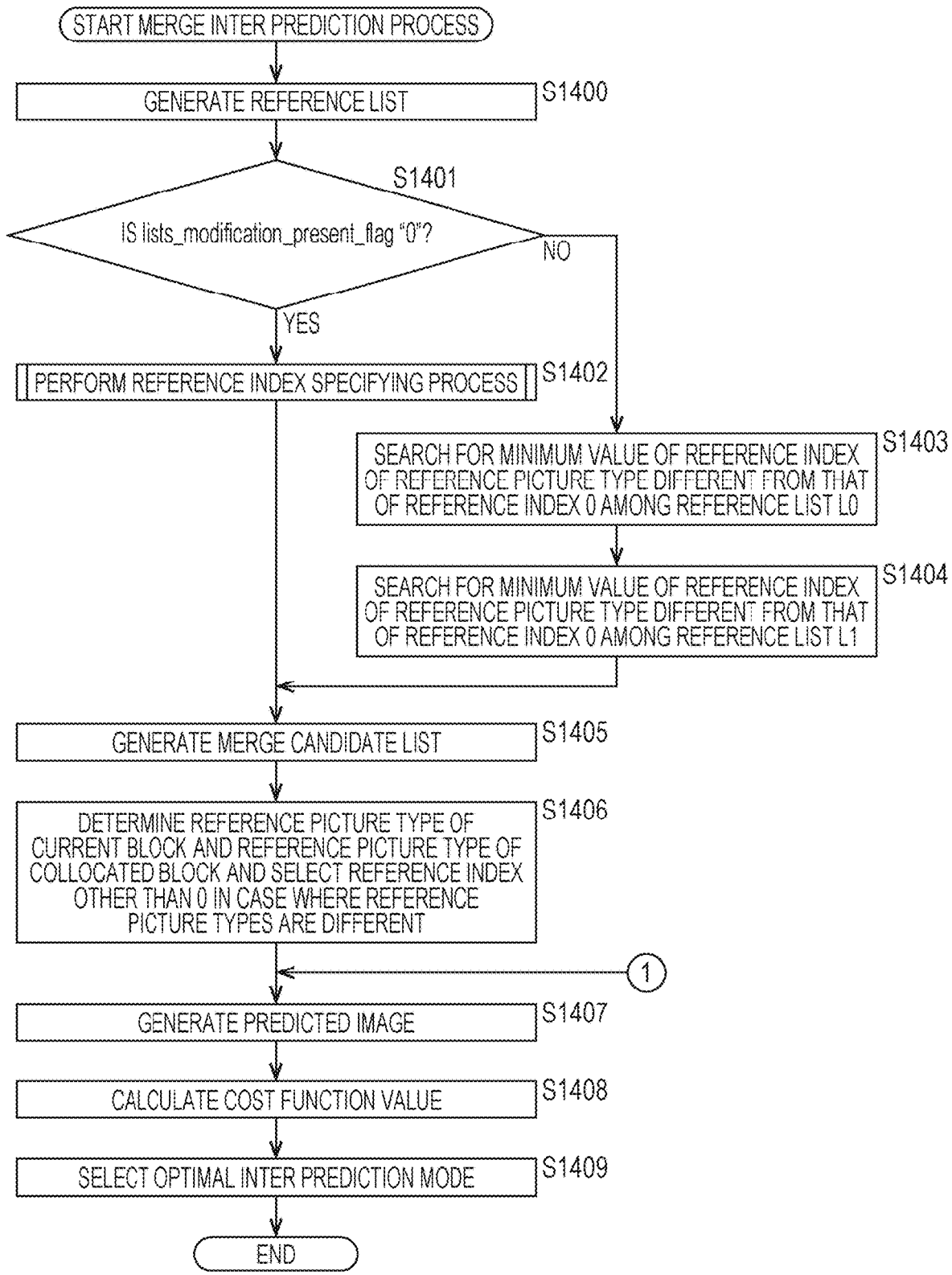
FIG. 16 is a flowchart that illustrates a merge inter prediction process performed by the coding apparatus illustrated in FIG. 13.

FIG. 16 is a flowchart that illustrates the merge inter prediction process performed by the merge inter prediction unit 1320 (FIG. 14) of the image coding apparatus 1300. This merge inter prediction process is performed in units of slices in a case where a multi-viewpoint image is coded in the merge mode.

In step S1400 illustrated in FIG. 16, the reference list generating unit 1321 of the merge inter prediction unit 1320 generates a reference list and stores the reference list. Information used for generating this reference list, for example, is coded and is included in the coded data as a part of the header information.

In step S1401, the selection unit 1322 determines whether or not the change identification information (lists_modification_present_flag) supplied from the setting unit 1302 is "0" indicating that the reference list has not been changed.

In a case where the change identification information is determined to be "0" in step S1401, the process proceeds to step S1402. In step S1402, the selection unit 1322 performs a reference index specifying process for specifying a minimum value of the reference index of the reference picture type different from the reference picture type of the reference index "0". This reference index specifying process will be described later in detail with reference to FIG. 17. After the process of step S1402, the process proceeds to step S1405.

On the other hand, in a case where the change identification information is determined not to be "0" in step S1401, in other words, in a case where change identification information is "1", the process proceeds to step S1403. The process of steps S1403 to S1409 is similar to the process of steps S1203 to S1206 and S1210 to S1212 illustrated in FIG. 6, and description thereof will not be presented. After the process of step S1409, the process ends.

Figure 17:
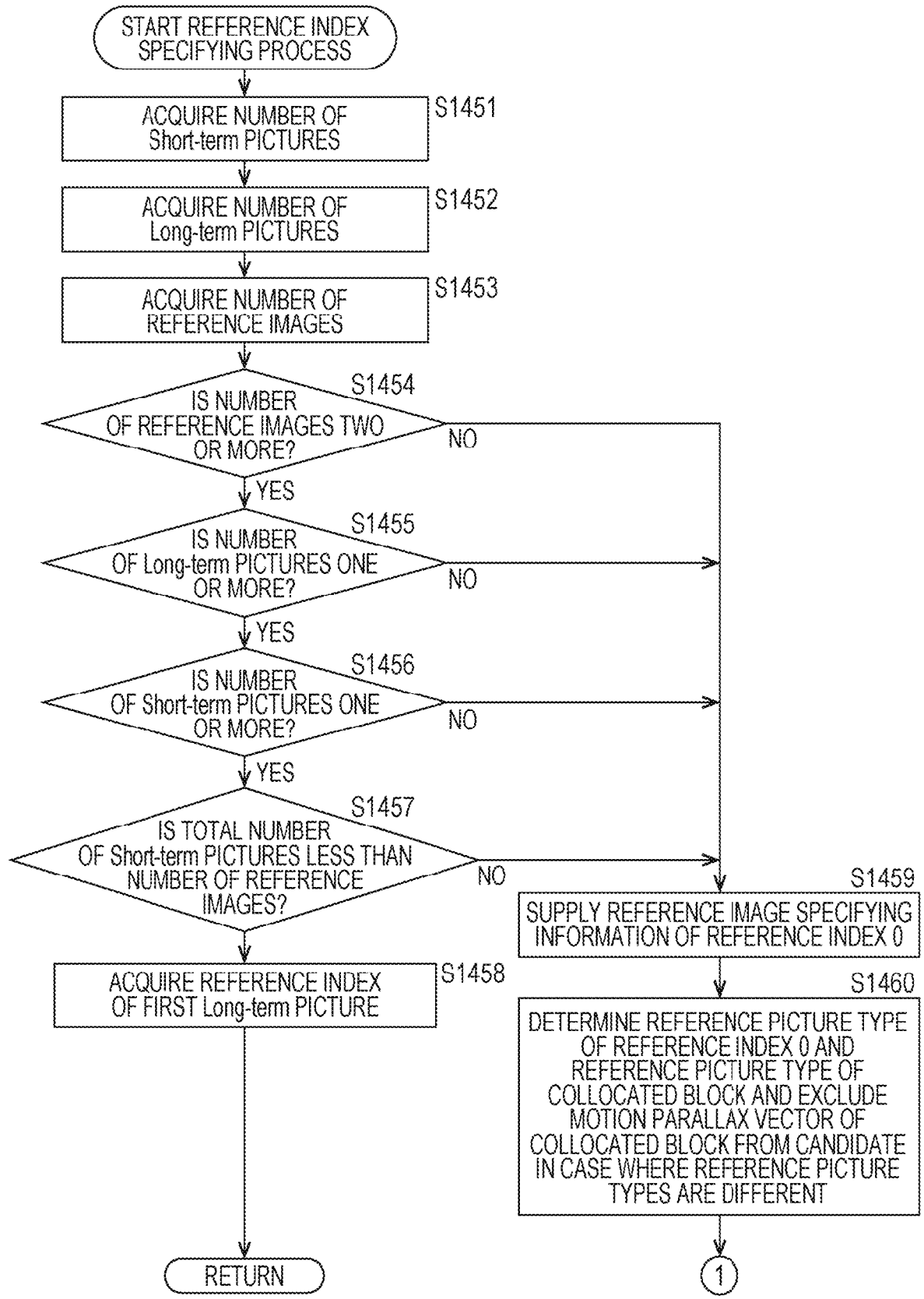
FIG. 17 is a flowchart that illustrates a reference index specifying process illustrated in FIG. 16 in detail.

FIG. 17 is a flowchart that illustrates the reference index specifying process of step S1402 illustrated in FIG. 16 in detail.

In step S1451 illustrated in FIG. 17, the selection unit 1322 acquires the number of Short-term pictures included in the RPS that is supplied from the setting unit 1302. In step S1452, the selection unit 1322 acquires the number of Long-term pictures included in the SPS that is supplied from the setting unit 1302. Here, the number of Long-term pictures may be included in a slice header.

In step S1453, the selection unit 1322 acquires the number of reference images included in the PPS that is supplied from the setting unit 1302. Here, the number of reference images may be included in the slice header. In addition, the subsequent process of steps S1454 to S1457 is performed for each of the reference list L0 and the reference list L1.

In step S1454, the selection unit 1322 determines whether or not the number of reference images is two or more. In a case where the number of reference images is determined to be two or more in step S1454, the selection unit 1322 determines whether or not the number of Long-term pictures is one or more in step S1455.

In a case where the number of Long-term pictures is determined to be one or more in step S1455, the selection unit 1322 determines whether or not the number of Short-term pictures is one or more in step S1456.

In a case where the number of Short-term pictures is determined to be one or more in step S1456, the selection unit 1322 determines whether or not a total number of Short-term pictures is less than the number of reference images in step S1457.

In a case where the total number of Short-term pictures is determined to be less than the number of reference images in step S1457, in other words, in a case where reference image specifying information of both the Short-term picture and the Long-term picture is registered in the reference list, the process proceeds to step S1458. In step S1458, the selection unit 1322 acquires a reference index of the first Long-term picture.

Figure 18:
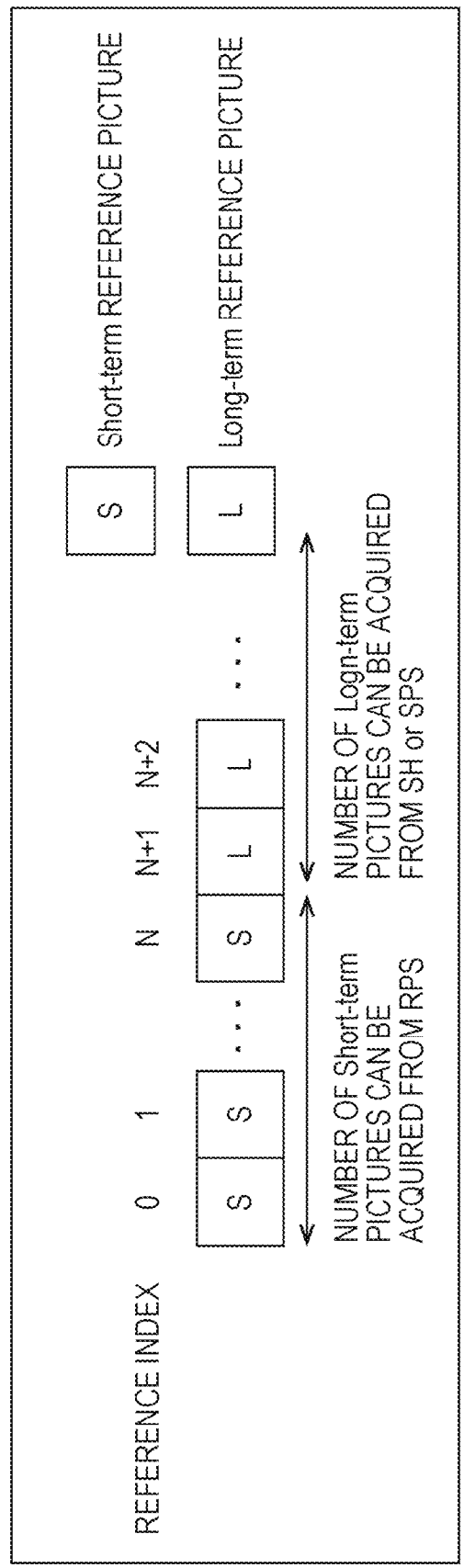
FIG. 18 is a diagram that illustrates a reference index.

Here, in a case where the change identification information is "0", as illustrated in FIG. 18, reference indexes smaller in order of the Short-term and the Long-term are assigned. Accordingly, since the reference index 0 is necessarily the Short-term, the selection unit 1322 may search for a reference index of the first Long-term picture. Since the number of Short-term pictures within the reference list can be acquired from the RPS, the selection unit 1322 acquires the number as a reference index of the first Long-term picture having the smallest reference index. The selection unit 1322 supplies the reference index and the reference image specifying information of the reference index "0" to the predicted image generating unit 1034. Then, the process is returned to step S1402 illustrated in FIG. 16, and the process proceeds to step S1405.

On the other hand, in a case where "No" is determined in the process of steps S1454 to S1457, the process proceeds to step S1459.

In step S1459, the selection unit 1322 supplies the reference image specifying information of the reference index "0" of the generated reference list to the predicted image generating unit 1034. The predicted image generating unit 1034 sets the reference image specifying information thereof as the reference image specifying information of the current block.

In step S1460, the merge candidate list generating unit 1323 determines whether or not the reference picture type of the reference index "0" and the reference picture type of each collocated block coincide with each other. Then, in a case where the reference picture type of the collocated block is different from the reference picture type of the reference index "0", the merge candidate list generating unit 1323 excludes the motion parallax vector of the collocated block from candidates for the prediction vector and generates a merge candidate list. Then, the process proceeds to step S1407 illustrated in FIG. 16, and the processes at steps S1407 and subsequent thereto are performed.

(Configuration Example of Decoding Apparatus)

Figure 19:
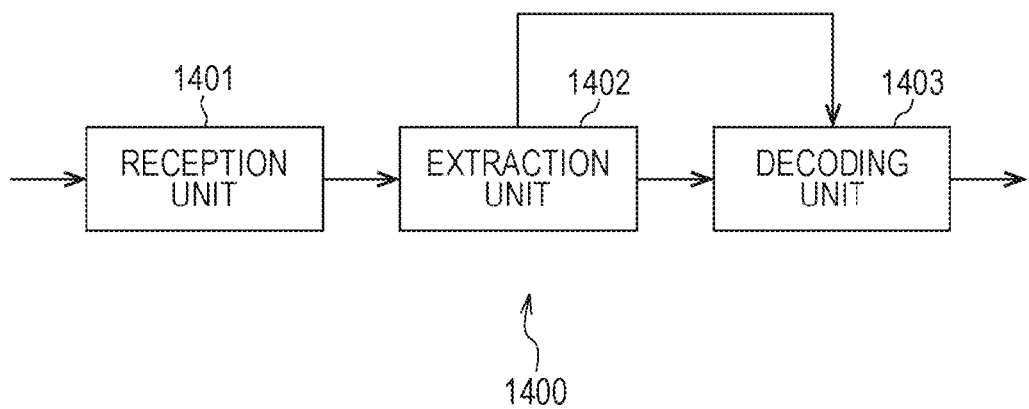
FIG. 19 is a block diagram that illustrates an example of the configuration of an image decoding apparatus, to which the present disclosure is applied, according to the second embodiment.

FIG. 19 is a block diagram that illustrates an example of the configuration of the image decoding apparatus, which decodes a coded stream transmitted from the image coding apparatus 1300 illustrated in FIG. 13, according to the second embodiment as an image processing device to which the present disclosure is applied.

The image decoding apparatus 1400 illustrated in FIG. 19 is configured by: a reception unit 1401; an extraction unit 1402; and a decoding unit 1403.

The reception unit 1401 of the image decoding apparatus 1400 receives a coded stream transmitted from the image coding apparatus 1300 and supplies the received coded stream to the extraction unit 1402.

The extraction unit 1402 extracts parameter sets such as the SPS, the PPS including the change identification information, and the RPS and the coded data from the coded stream supplied from the reception unit 1401 and supplies the parameter sets and the coded data to the decoding unit 1403.

The decoding unit 1403 performs intra decoding or inter decoding according to a motion prediction or a parallax prediction for the coded data supplied from the extraction unit 1402 by using a system corresponding to the image coding apparatus 1300. More specifically, in a case where the change identification information included in the PPS that is supplied from the extraction unit 1102 is "1", the decoding unit 1103 searches for a reference index of the reference picture type different from the reference picture type of the reference index "0" in the merge mode.

On the other hand, in a case where the change identification information is "0", the coding unit 1301 does not search for a reference index but sets a predetermined reference index as the reference index of the reference picture type different from the reference picture type of the reference index "0" in the merge mode. The decoding unit 1403 outputs a multi-viewpoint image that is acquired as a result of the decoding process.

(Configuration Example of Decoding Unit)

The configuration of the decoding unit 1403 illustrated in FIG. 19 is the same as that of the decoding unit 1103 illustrated in FIG. 8 except for the merge inter prediction unit of the motion parallax compensation unit 1132. Thus, here, only the configuration of the merge inter prediction unit of the decoding unit 1403 will be described.

(Configuration Example of Merge Inter Prediction Unit)

Figure 20:
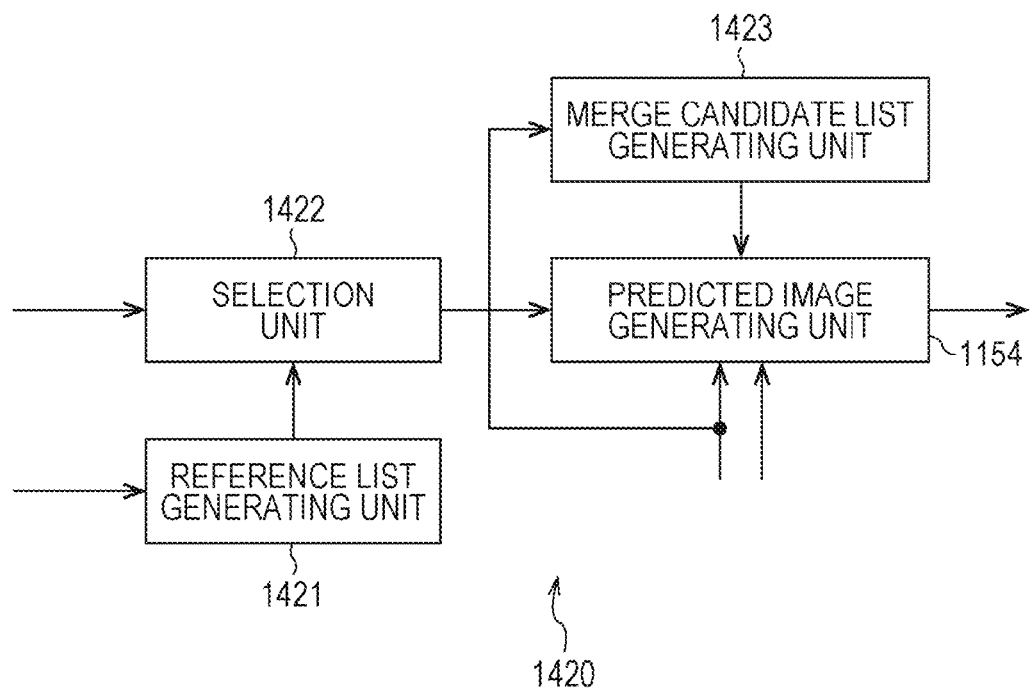
FIG. 20 is a block diagram that illustrates the configuration of a merge inter prediction unit of a decoding unit illustrated in FIG. 19.

FIG. 20 is a block diagram that illustrates the configuration of the merge inter prediction unit 1420 of the decoding unit 1403 illustrated in FIG. 19.

Among the configuration illustrated in FIG. 20, the same reference numeral is assigned to the same configuration as that illustrated in FIG. 9, and duplicate description will not be presented as is appropriate.

In the configuration of the merge inter prediction unit 1420 illustrated in FIG. 20, a reference list generating unit 1421, a selection unit 1422, and a merge candidate list generating unit 1423 are disposed instead of the reference list generating unit 1151, the selection unit 1152, and the merge candidate list generating unit 1153, which is different from the configuration of the merge inter prediction unit 1150 illustrated in FIG. 9.

The reference list generating unit 1421 of the merge inter prediction unit 1420 generates the same reference list as the reference list generated by the reference list generating unit 1321 illustrated in FIG. 14 in units of slices based on the information for generating the reference list that is supplied from the lossless decoding unit 1122. The reference list is stored in the reference list generating unit 1421.

The selection unit 1422, similarly to the selection unit 1322 illustrated in FIG. 14, selects a minimum value of the reference index of a reference picture type different from the picture type of the reference index "0" from the reference list based on the change identification information supplied from the extraction unit 1102. The selection unit 1422 supplies the reference image specifying information of the selected reference index and the reference image specifying information of the reference index "0" to the predicted image generating unit 1154.

The merge candidate list generating unit 1423, similarly to the merge candidate list generating unit 1323 illustrated in FIG. 14, generates a merge candidate list for the prediction block of the inter prediction mode indicated by the inter prediction information supplied from the lossless decoding unit 1122. The merge candidate list generating unit 1423 stores the generated merge candidate list.

(Description of Process of Image Decoding Apparatus)

Figure 21:
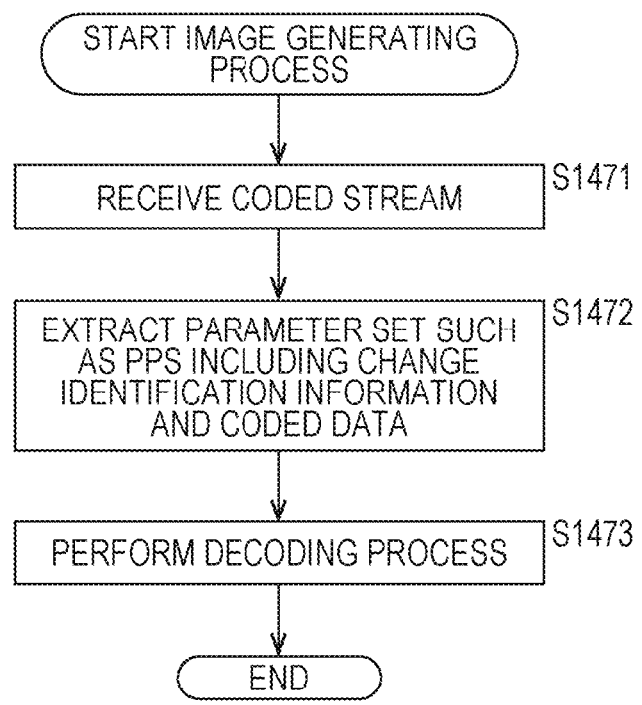
FIG. 21 is a flowchart that illustrates an image generating process performed by the image decoding apparatus illustrated in FIG. 19.

FIG. 21 is a flowchart that illustrates the image generating process performed by the image decoding apparatus 1400 illustrated in FIG. 19. This image generating process, for example, is started when a coded stream is transmitted from the image coding apparatus 1300.

In step S1471, the reception unit 1401 of the image decoding apparatus 1400 receives a coded stream transmitted from the image coding apparatus 1300 and supplies the received coded stream to the extraction unit 1402.

In step S1472, the extraction unit 1402 extracts parameter sets such as an SPS and a PPS including the change identification information, and an RPS and coded data from the coded stream that is supplied from the reception unit 1401 and supplies the parameter sets and the coded data to the decoding unit 1403.

In step S1473, the decoding unit 1403 performs a decoding process of the coded data supplied from the extraction unit 1402 for each viewpoint by using a system corresponding to the image coding apparatus 1300. This decoding process will be described later in detail. After the process of step S1473, the process ends.

The decoding process of step S1473 illustrated in FIG. 21 is the same as the decoding process illustrated in FIG. 11 except for the merge inter prediction process. Thus, hereinafter, only the merge inter prediction process will be described.

Figure 22:
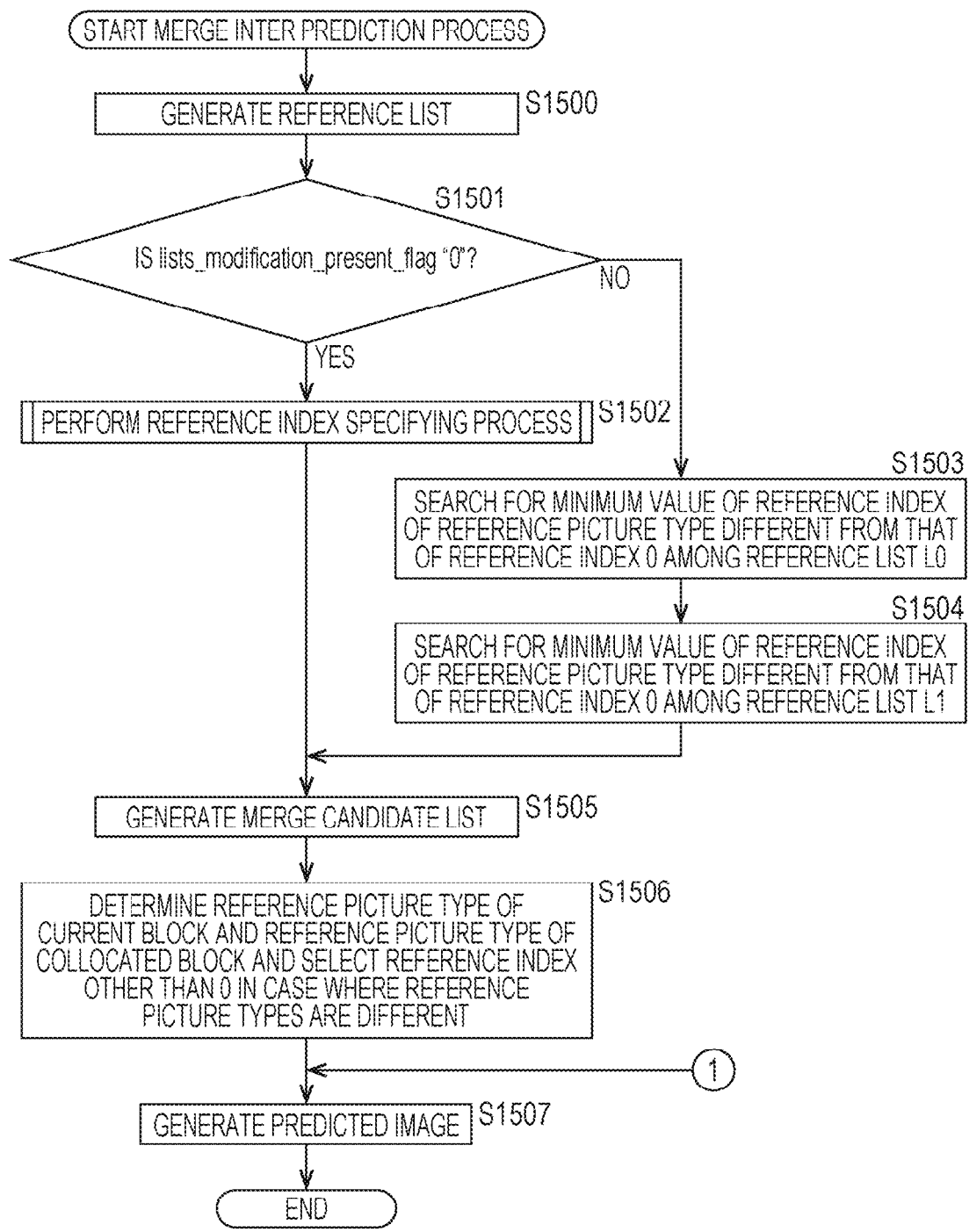
FIG. 22 is a flowchart that illustrates a merge inter prediction process performed by the merge inter prediction unit illustrated in FIG. 20.

FIG. 22 is a flowchart that illustrates a merge inter prediction process performed by the merge inter prediction unit 1420 illustrated in FIG. 20. In a case where a multi-viewpoint image is decoded in the merge mode, this merge inter prediction process is performed in units of slices.

In step S1500 illustrated in FIG. 22, the reference list generating unit 1421 of the merge inter prediction unit 1420 generates and stores a reference list based on the information for generating the reference list that is supplied from the lossless decoding unit 1122.

In step S1401, the selection unit 1422 determines whether or not the change identification information (lists_modification_present_flag) supplied from the extraction unit 1402 is "0". In a case where the change identification information is determined to be "0" in step S1501, the process proceeds to step S1502.

In step S1502, the selection unit 1422 performs the reference index specifying process illustrated in FIG. 17. However, the process of step S1460, is performed in units of prediction blocks of the optimal inter prediction mode that is indicated by the inter prediction information. After the process of step S1502, the process proceeds to step S1505.

On the other hand, in a case where the change identification information is determined to be "1" in step S1501, the process proceeds to step S1503. The process of steps S1503 to S1507 is similar to the process of steps S1303 to S1306 and S1310 illustrated in FIG. 12, and description thereof will not be presented. After the process of step S1507, the process ends.

As described above, in the second embodiment, in a case where the change identification information is "0", a search for a reference index is not performed, and the reference index is specified by the reference index specifying process, whereby the processing amount can be reduced.

In addition, the first embodiment and the second embodiment may be combined together. In such a case, the merge inter prediction process is performed based on the restriction identification information and the change identification information. In addition, in the second embodiment, the reference list may be configured to be generated in units of pictures.

Furthermore, a series of the processes described above may be applied also to hierarchical image coding (spatial scalability)/hierarchical image decoding (multi-layered encoder/decoder). In other words, also in a case where hierarchical image coding/hierarchical image decoding is performed, the processing amount can be reduced.

In addition, the present technology, for example, may be applied to an image coding apparatus and an image decoding apparatus that are used when image information (bit stream) compressed using an orthogonal transform such as a discrete cosine transform and motion compensation, like MPEG, H. 26x, or the like, is received through a network medium such as satellite broadcast, cable television, the Internet, or a mobile phone. In addition, the present technology may be applied to an image coding apparatus and an image decoding apparatus that are used when information is processed on a storage medium such as an optical disc, a magnetic disk, or a flash memory. Furthermore, the present technology may be applied also to the motion prediction/compensation device included in the image coding apparatus and the image decoding apparatus described above, and the like.

3. Third Embodiment (Configuration Example of Computer>

A series of the processes described above can be performed either by hardware or by software. In a case where the series of the processes is performed by software, a program configuring the software is installed to a computer.

Here, the computer includes a computer that is built in dedicated hardware, a computer such as a general-purpose personal computer that can execute various functions by installing various programs thereto, and the like.

Figure 23:
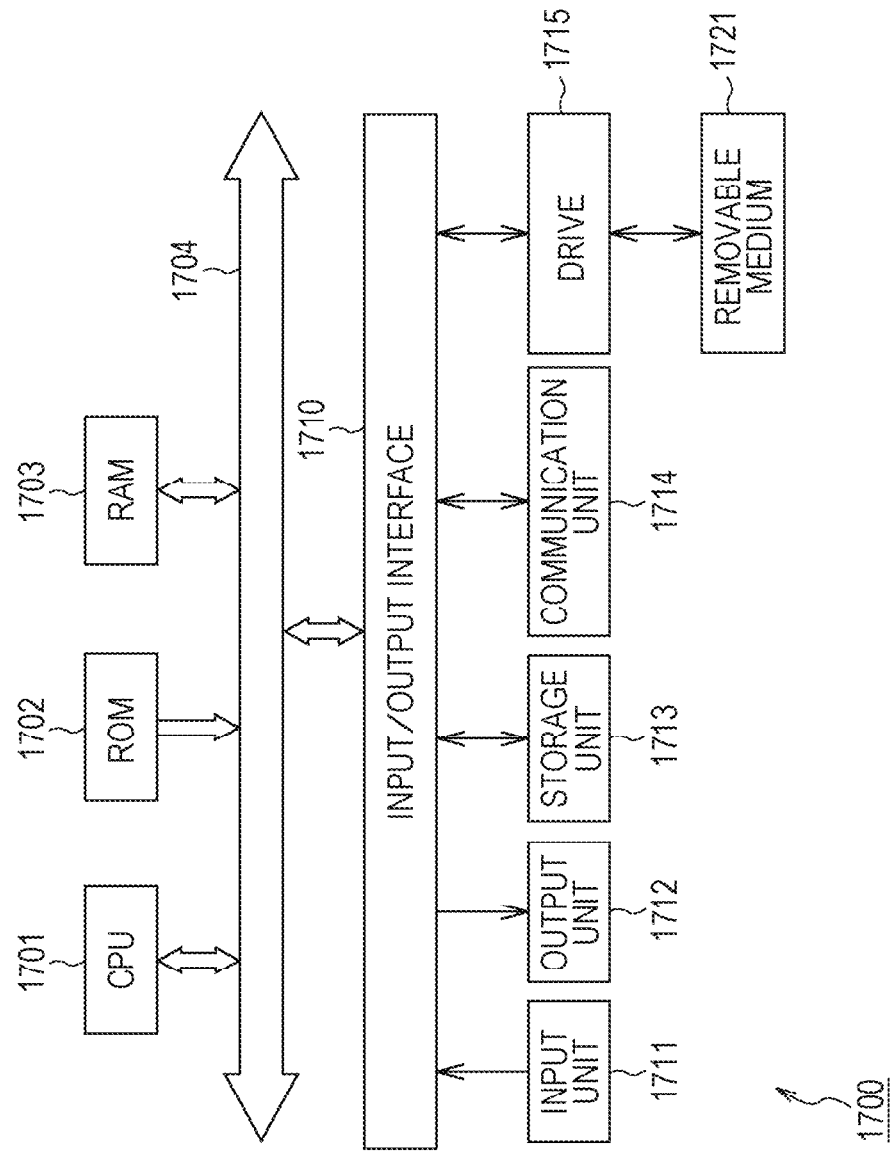
FIG. 23 is a block diagram that illustrates an example of the configuration of a personal computer.

As illustrated in FIG. 23, a CPU (Central Processing Unit) 1701 of a personal computer 1700 executes various processes according to a program stored in a ROM (Read Only Memory) 1702 or a program loaded from a storage unit 1713 into a RAM (Random Access Memory) 1703. In the RAM 1703, data necessary for the CPU 1701 to execute the various processes and the like are also stored as is necessary.

The CPU 1701, the ROM 1702, and the RAM 1703 are interconnected to one another through a bus 1704. An input/output interface 1710 is also connected to the bus 1704.

An input unit 1711 configured using a keyboard, a mouse, or the like, an output unit 1712 configured using a display configured by a CRT (Cathode Ray Tube), an LCD (Liquid Crystal Display), or the like, a speaker, and the like, a storage unit 1713 configured using a hard disk or the like, and a communication unit 1714 configured by a modem and the like are connected to the input/output interface 1710. The communication unit 1714 performs a communication process through a network including the Internet.

A drive 1715 is connected to the input/output interface 1710 as is necessary, a removable medium 1721 such as a magnetic disk, an optical disc, a magneto-optical disk, or a semiconductor memory is appropriately mounted thereon, and a computer program read therefrom is installed to the storage unit 1713 as is necessary.

In a case where the above-described series of the processes is executed by the software, a program configuring the software is installed from a network or a recording medium.

The recording medium, for example, as illustrated in FIG. 23, is configured by not only the removable medium 1721 that is configured by a magnetic disk (including a flexible disk), an optical disc (including a CD-ROM (Compact Disc-Read Only Memory), a DVD (Digital Versatile Disc)), a magneto-optical disk (including an MD (Mini Disc)), or a semiconductor memory in which the program is recorded, distributed to a user for distributing the program independently from an device main body but also the ROM 1702, in which the program is recorded, distributed to the user in a state being embedded in advance in the device main body, a hard disk included in the storage unit 1713, or the like.

In addition, the program executed by the computer may be a program that executes the processes in a time series along the sequence described in this specification or a program that executes the processes in a parallel manner or at necessary timing such as at the timing of being called.

Furthermore, in this specification, a step describing the program recorded on a recording medium includes not only a process performed in a time series along the described sequence but also a process that is performed in a parallel manner or an individual manner without being necessarily processed in a time series.

In addition, in this specification, a system represents a whole apparatus that is configured by a plurality of devices (apparatuses).

Furthermore, a configuration described above as one device (or one processing unit) may be divided so as to be configured as a plurality of devices (or processing units). To the contrary, a configuration described above as a plurality of devices (or processing units) may be arranged to be configured as one device (or one processing unit). In addition, a configuration that has not been described above may be added to the configuration of each device (or each processing unit). As long as the overall configuration and the overall operation of the system are substantially the same, a part of the configuration of a specific device (or a specific processing unit) may be configured to be included in a configuration of another device (or another processing unit). In other words, the present technology is not limited to the embodiments described above, but various changes may be made therein in a range not departing from the concept of the present technology.

4. Fourth Embodiment

The image coding apparatus and the image decoding apparatus according to the embodiments described above can be applied to various electronic apparatuses such as a transmitter or a receiver for wired broadcasting such as satellite broadcasting or cable TV, transmission on the Internet, transmission to a terminal through cellular communication, or the like, a recording apparatus that records an image on a medium such as an optical disc, a magnetic disk, or a flash memory, or a reproduction apparatus that reproduces an image from the storage medium. Hereinafter, four application examples will be described.

<First Application Example: Television Receiver>

Figure 24:
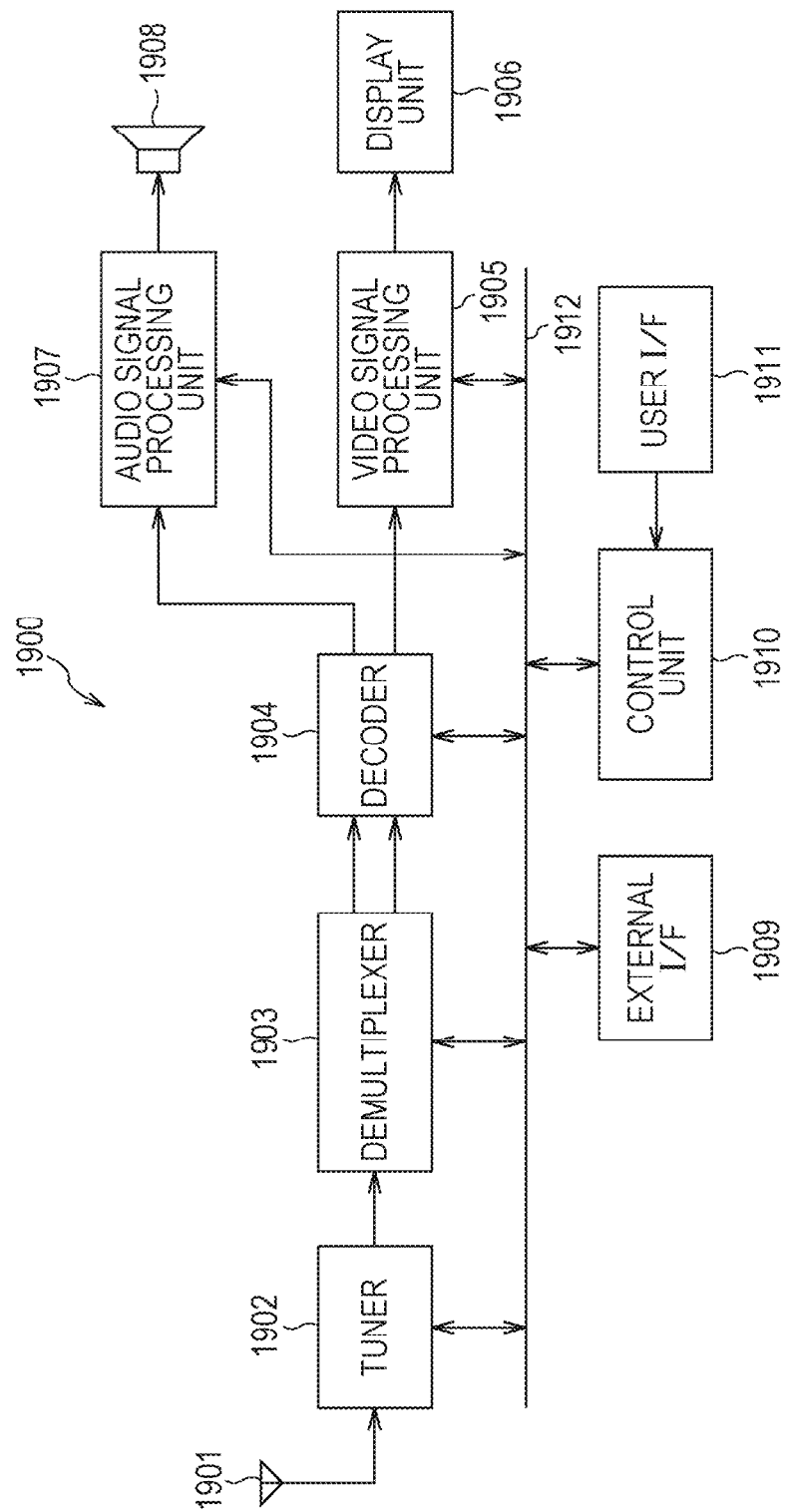
FIG. 24 is a block diagram that illustrates an example of the schematic configuration of a television apparatus.

FIG. 24 illustrates an example of the schematic configuration of a television apparatus to which the above-described embodiment is applied. The television apparatus 1900 includes an antenna 1901, a tuner 1902, a demultiplexer 1903, a decoder 1904, a video signal processing unit 1905, a display unit 1906, an audio signal processing unit 1907, a speaker 1908, an external interface 1909, a control unit 1910, a user interface 1911, and a bus 1912.

The tuner 1902 extracts a signal of a desired channel from a broadcast signal received through the antenna 1901 and demodulates the extracted signal. Then, the tuner 1902 outputs a coded bit stream acquired through demodulation to the demultiplexer 1903. In other words, the tuner 1902 serves as a transmission unit of the television apparatus 1900 that receives a coded stream in which an image is coded.

The demultiplexer 1903 separates a video stream and an audio stream of a program to be watched from the coded bit stream and outputs each separated stream to the decoder 1904. In addition, the demultiplexer 1903 extracts auxiliary data such as an EPG (Electronic Program Guide) from the coded bit stream and supplies the extracted data to the control unit 1910. Furthermore, the demultiplexer 1903 may perform descrambling in a case where the coded bit stream is scrambled.

The decoder 1904 decodes the video stream and the audio stream input from the demultiplexer 1903. Then, the decoder 1904 outputs video data generated by the decoding process to the video signal processing unit 1905. In addition, the decoder 1904 outputs audio data generated by the decoding process to the audio signal processing unit 1907.

The video signal processing unit 1905 reproduces the video data input from the decoder 1904 and causes the display unit 1906 to display video. The video signal processing unit 1905 may also cause the display unit 1906 to display an application screen supplied through the network. In addition, the video signal processing unit 1905 may perform an additional process such as noise removal for the video data according to a setting. Furthermore, the video signal processing unit 1905 may generate a GUI (Graphical User Interface) image such as a menu, a button, and a cursor and superimpose the generated image on an output image.

The display unit 1906 is driven according to a drive signal supplied from the video signal processing unit 1905 so as to display a video or image on a video screen of a display device (for example, a liquid crystal display, a plasma display, an OELD (Organic ElectroLuminescence Display (organic EL display), or the like).

The audio signal processing unit 1907 performs a reproducing process such as D/A conversion and amplification for the audio data input from the decoder 1904 and causes the speaker 1908 to output the audio. In addition, the audio signal processing unit 1907 may perform an additional process such as noise removal for the audio data.

The external interface 1909 is an interface for connecting the television apparatus 1900 to an external device or the network. For example, a video stream or an audio stream received through the external interface 1909 may be decoded by the decoder 1904. In other words, the external interface 1909 also serves as a transmission unit of the television apparatus 1900 that receives a coded stream in which an image is coded.

The control unit 1910 includes a processor such as a CPU and a memory such as a RAM or a ROM. The memory stores a program executed by the CPU, program data, EPG data, data acquired through the network, and the like. The program stored in the memory, for example, is read by the CPU on activation of the television apparatus 1900 and is executed. The CPU controls the operation of the television apparatus 1900, for example, according to an operation signal input from the user interface 1911 by executing the program.

The user interface 1911 is connected to the control unit 1910. The user interface 1911, for example, includes a button and a switch for a user to operate the television apparatus 1900, a reception unit for a remote control signal, and the like. The user interface 1911 detects a user's operation through such components, generates an operation signal, and outputs the generated operation signal to the control unit 1910.

The bus 1912 connects the tuner 1902, the demultiplexer 1903, the decoder 1904, the video signal processing unit 1905, the audio signal processing unit 1907, the external interface 1909, and the control unit 1910 to each other.

In the television apparatus 1900 configured in this way, the decoder 1904 has the function of the image decoding apparatus according to the above-described embodiment. Accordingly, when an image is decoded by the television apparatus 1900, the processing amount can be reduced.

<Second Application Example: Mobile Phone>

Figure 25:
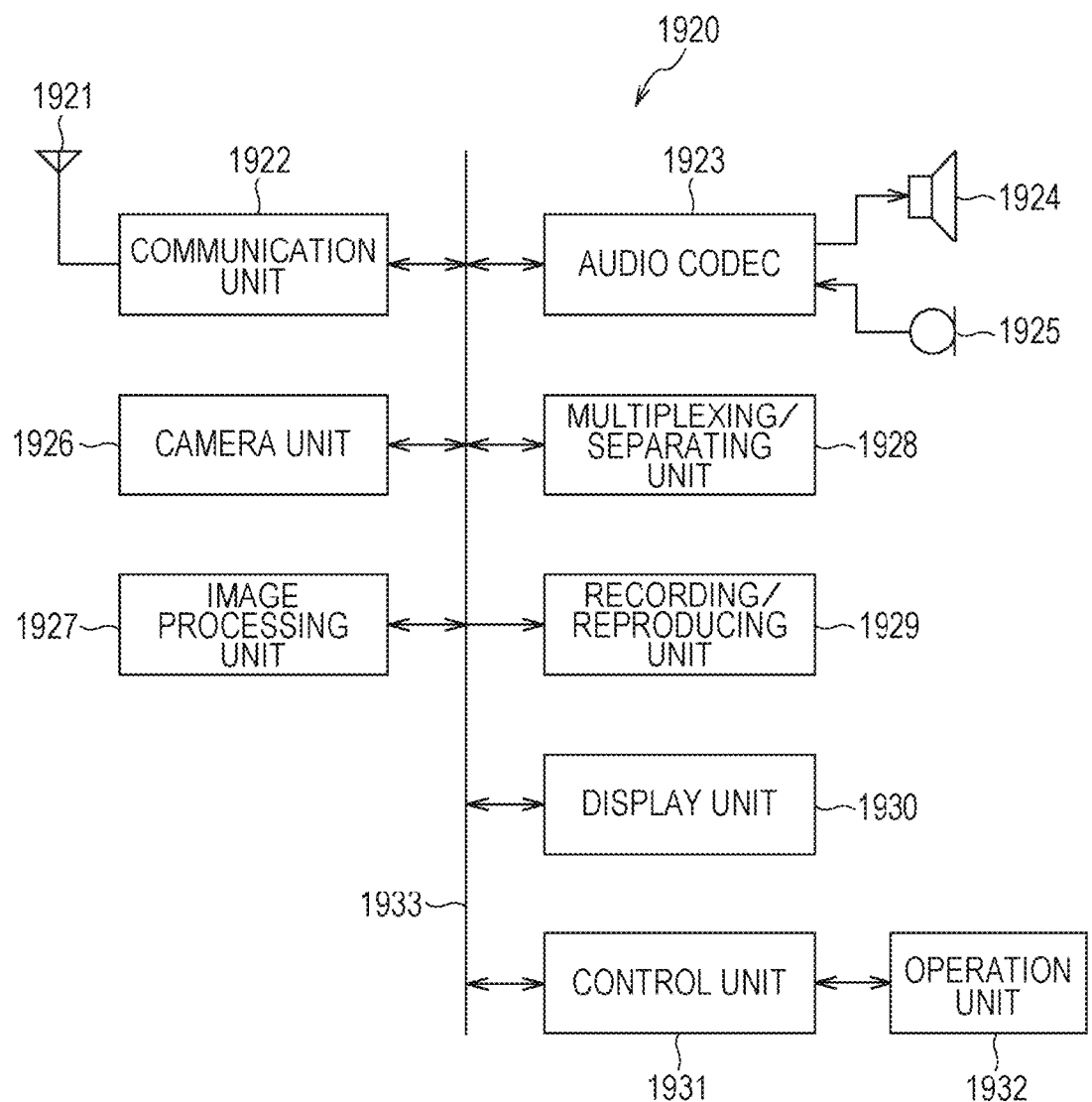
FIG. 25 is a block diagram that illustrates an example of the schematic configuration of a mobile phone.

FIG. 25 illustrates an example of the schematic configuration of a mobile phone to which the above-described embodiment is applied. The mobile phone 1920 includes an antenna 1921, a communication unit 1922, an audio codec 1923, a speaker 1924, a microphone 1925, a camera unit 1926, an image processing unit 1927, a multiplexing/separating unit 1928, a recording/reproducing unit 1929, a display unit 1930, a control unit 1931, an operation unit 1932, and a bus 1933.

The antenna 1921 is connected to the communication unit 1922. The speaker 1924 and the microphone 1925 are connected to the audio codec 1923. The operation unit 1932 is connected to the control unit 1931. The bus 1933 connects the communication unit 1922, the audio codec 1923, the camera unit 1926, the image processing unit 1927, the multiplexing/separating unit 1928, the recording/reproducing unit 1929, the display unit 1930, and the control unit 1931 to each other.

The mobile phone 1920 performs operation such as transmission/reception of an audio signal, transmission/reception of an e-mail or image data, image capturing, and recording of data in various operation modes including a voice call mode, a data communication mode, an imaging mode, and a video-phone mode.

In the voice call mode, an analog audio signal generated by the microphone 1925 is supplied to the audio codec 1923. The audio codec 1923 converts the analog audio signal into audio data, performs A/D conversion of the converted audio data, and compresses the audio data. Then, the audio codec 1923 outputs the compressed audio data to the communication unit 1922. The communication unit 1922 codes and modulates the audio data to generate a transmission signal. Then, the communication unit 1922 transmits the generated transmission signal to a base station (not illustrated in the figure) through the antenna 1921. In addition, the communication unit 1922 amplifies a wireless signal received through the antenna 1921 and performs frequency conversion of the wireless signal, thereby acquiring a reception signal. Then, the communication unit 1922 generates audio data by demodulating and decoding the reception signal and outputs the generated audio data to the audio codec 1923. The audio codec 1923 performs decompression and D/A conversion of the audio data, thereby generating an analog audio signal. Then, the audio codec 1923 supplies the generated audio signal to the speaker 1924 to causes audio to be outputted.

In the data communication mode, for example, the control unit 1931 generates character data configuring an e-mail according to a user's operation performed through the operation unit 1932. In addition, the control unit 1931 causes the display unit 1930 to display characters. The control unit 1931 generates e-mail data according to a transmission instruction from the user through the operation unit 1932 and outputs the generated e-mail data to the communication unit 1922. The communication unit 1922 codes and modulates the e-mail data, thereby generating a transmission signal. Then, the communication unit 1922 transmits the generated transmission signal to a base station (not illustrated in the figure) through the antenna 1921. In addition, the communication unit 1922 performs amplification and frequency conversion of the wireless signal received through the antenna 1921, thereby acquiring a reception signal. Then, the communication unit 1922 demodulates and decodes the reception signal to restore the e-mail data and outputs the restored e-mail data to the control unit 1931. The control unit 1931 causes the display unit 1930 to display a content of the e-mail data and supplies the e-mail data to the recording/reproducing unit 1929 to cause the e-mail data to be written onto a recording medium thereof.

The recording/reproducing unit 1929 includes an arbitrary readable and writable storage medium. For example, the storage medium may be a built-in storage medium such as a RAM and a flash memory or may be an external mounting-type storage medium such as a hard disk, a magnetic disk, a magneto-optical disc, an optical disc, a USB (Unallocated Space Bitmap) memory, or a memory card.

In the imaging mode, for example, the camera unit 1926 images an object to generate image data and outputs the generated image data to the image processing unit 1927. The image processing unit 1927 codes the image data input from the camera unit 1926 and supplies a coded stream to the recording/reproducing unit 1929 to cause the coded stream to be written onto a recording medium thereof.

In addition, in the video-phone mode, for example, the multiplexing/separating unit 1928 multiplexes the video stream coded by the image processing unit 1927 and the audio stream input from the audio codec 1923 and outputs a resultant multiplexed stream to the communication unit 1922. The communication unit 1922 codes and modulates the stream, thereby generating a transmission signal. Then, the communication unit 1922 transmits the generated transmission signal to a base station (not illustrated in the figure) through the antenna 1921. In addition, the communication unit 1922 performs amplification and frequency conversion of a wireless signal received through the antenna 1921, thereby acquiring a reception signal. The transmission signal and the reception signal are acquired with the coded bit stream being included therein. Then, the communication unit 1922 restores the stream by demodulating and decoding the reception signal and outputs the restored stream to the multiplexing/separating unit 1928. The multiplexing/separating unit 1928 separates a video stream and an audio stream from the input stream and outputs the video stream and the audio stream respectively to the image processing unit 1927 and the audio codec 1923. The image processing unit 1927 decodes the video stream to generate video data. The video data is supplied to the display unit 1930, and a series of images is displayed by the display unit 1930. The audio codec 1923 performs decompression and D/A conversion of the audio stream, thereby generating an analog audio signal. Then, the audio codec 1923 supplies the generated audio signal to the speaker 1924 to cause an audio to be outputted.

In the mobile phone 1920 configured in this way, the image processing unit 1927 has the functions of the image coding apparatus and the image decoding apparatus according to the above-described embodiments. Accordingly, when an image is coded and decoded in the mobile phone 1920, the processing amount can be reduced.

<Third Application Example: Recording and Reproducing Apparatus>

Figure 26:
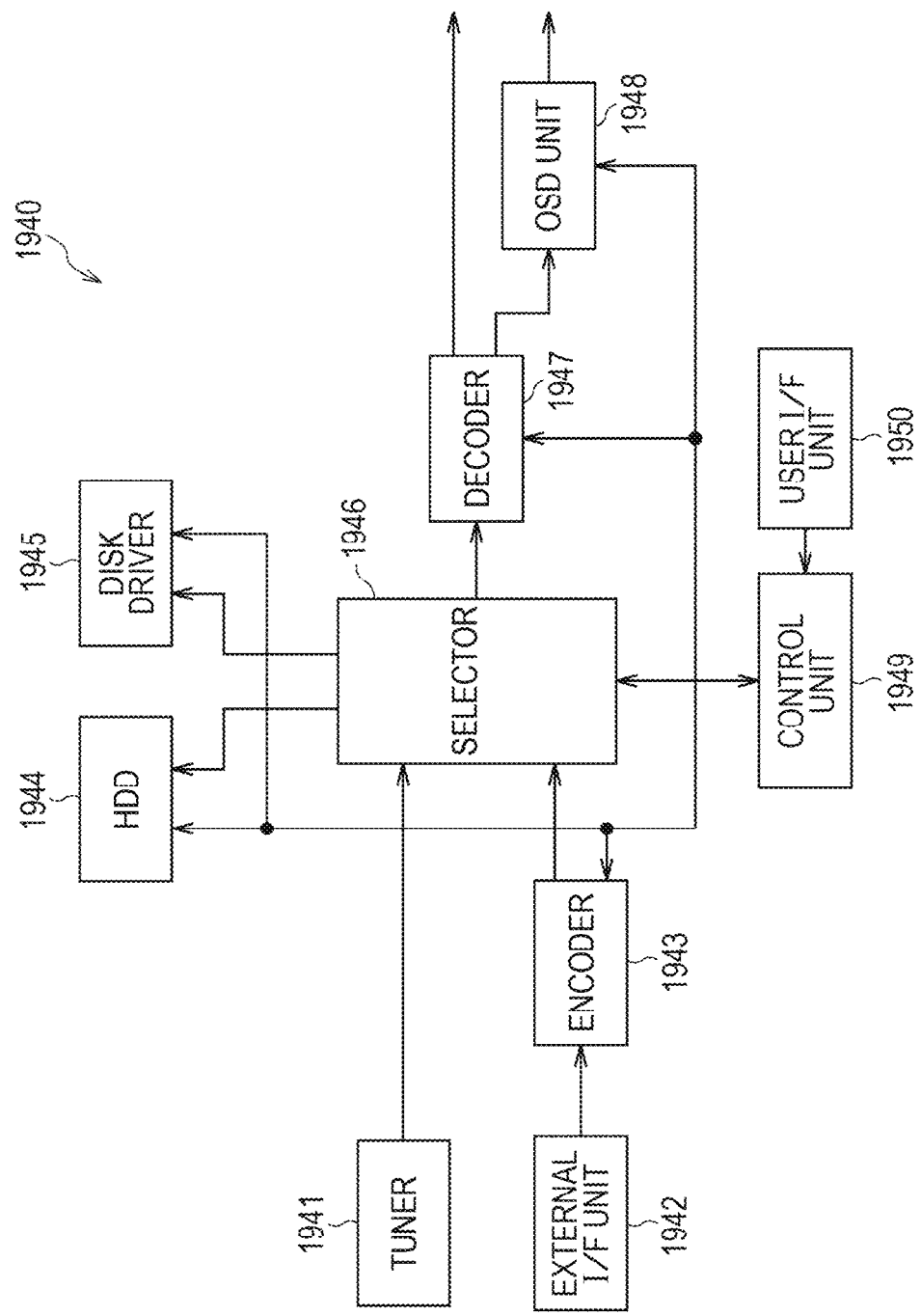
FIG. 26 is a block diagram that illustrates an example of the schematic configuration of a recording and reproducing apparatus.

FIG. 26 illustrates an example of the schematic configuration of a recording and reproducing apparatus to which the above-described embodiment is applied. The recording and reproducing apparatus 1940, for example, codes audio data and video data of a received broadcast program and records the coded data on a recording medium. In addition, the recording and reproducing apparatus 1940, for example, may code audio data and video data acquired from another apparatus and record the coded data on a recording medium. Furthermore, the recording and reproducing apparatus 1940, for example, reproduces the data recorded on the recording medium using the monitor and the speaker according to a user's instruction. At that time, the recording and reproducing apparatus 1940 decodes the audio data and the video data.

The recording and reproducing apparatus 1940 includes a tuner 1941, an external interface unit 1942, an encoder 1943, an HDD (Hard Disk Drive) 1944, a disk drive 1945, a selector 1946, a decoder 1947, an OSD (On-Screen Display) 1948, a control unit 1949, and a user interface unit 1950.

The tuner 1941 extracts a signal of a desired channel from a broadcast signal received through an antenna (not illustrated in the figure) and demodulates the extracted signal. Then, the tuner 1941 outputs a coded bit stream acquired by the demodulation process to the selector 1946. In other words, the tuner 1941 serves as a transmission unit of the recording and reproducing apparatus 1940.

The external interface unit 1942 is an interface used for connecting the recording and reproducing apparatus 1940 and an external device or the network. The external interface unit 1942, for example, may be an IEEE (Institute of Electrical and Electronic Engineers) 1394 interface, a network interface, a USB interface, a flash memory interface or the like. For example, the video data and the audio data received through the external interface unit 1942 are input to the encoder 1943. In other words, the external interface unit 1942 serves as the transmission unit of the recording and reproducing apparatus 1940.

In a case where the video data and the audio data input from the external interface unit 1942 are not coded, the encoder 1943 codes the video data and the audio data. Then, the encoder 1943 outputs a coded bit stream to the selector 1946.

The HDD 1944 records the coded bit stream in which contents data such as a video and an audio is compressed, various programs, and other data in an internal hard disk. When a video and an audio are reproduced, the HDD 1944 reads data thereof from the hard disk.

The disk drive 1945 records and reads data on/from a loaded recording medium. The recording medium loaded into the disk drive 1945, for example, may be a DVD disc (a DVD-Video, a DVD-RAM, a DVD-R, a DVD-RW, DVD+R, a DVD+RW, or the like), a Blu-ray (registered trademark) disc, or the like.

When a video and an audio are recorded, the selector 1946 selects a coded bit stream input from the tuner 1941 or the encoder 1943 and outputs the selected coded bit stream to the HDD 1944 or the disk drive 1945. In addition, when the video and the audio are reproduced, the selector 1946 outputs the coded bit stream input from the HDD 1944 or the disk drive 1945 to the decoder 1947.

The decoder 1947 decodes the coded bit stream to generate video data and audio data. Then, the decoder 1947 outputs the generated video data to the OSD 1948. In addition, the decoder 1904 outputs the generated audio data to an external speaker.

The OSD 1948 reproduces the video data input from the decoder 1947, thereby displaying the video. The OSD 1948 may superimpose an image of a GUI such as a menu, a button, or a cursor on the displayed video.

The control unit 1949 includes a processor such as a CPU and a memory such as a RAM or a ROM. The memory stores a program executed by the CPU, program data, and the like. The program stored in the memory, for example, is read and executed by the CPU on activation of the recording and reproducing apparatus 1940. The CPU controls the operation of the recording and reproducing apparatus 1940, for example, according to an operation signal input from the user interface unit 1950 by executing the program.

The user interface unit 1950 is connected to the control unit 1949. The user interface unit 1950, for example, includes a button and a switch for the user to operate the recording and reproducing apparatus 1940 and a reception unit for a remote control signal. The user interface unit 1950 detects a user's operation through the constituent elements to generate an operation signal and outputs the generated operation signal to the control unit 1949.

In the recording and reproducing apparatus 1940 configured in this way, the encoder 1943 has the function of the image coding apparatus according to the above-described embodiment. In addition, the decoder 1947 has the function of the image decoding apparatus according to the above-described embodiment. Accordingly, when an image is coded and decoded in the recording and reproducing apparatus 1940, the processing amount can be reduced.

<Fourth Application Example: Imaging Apparatus>

Figure 27:
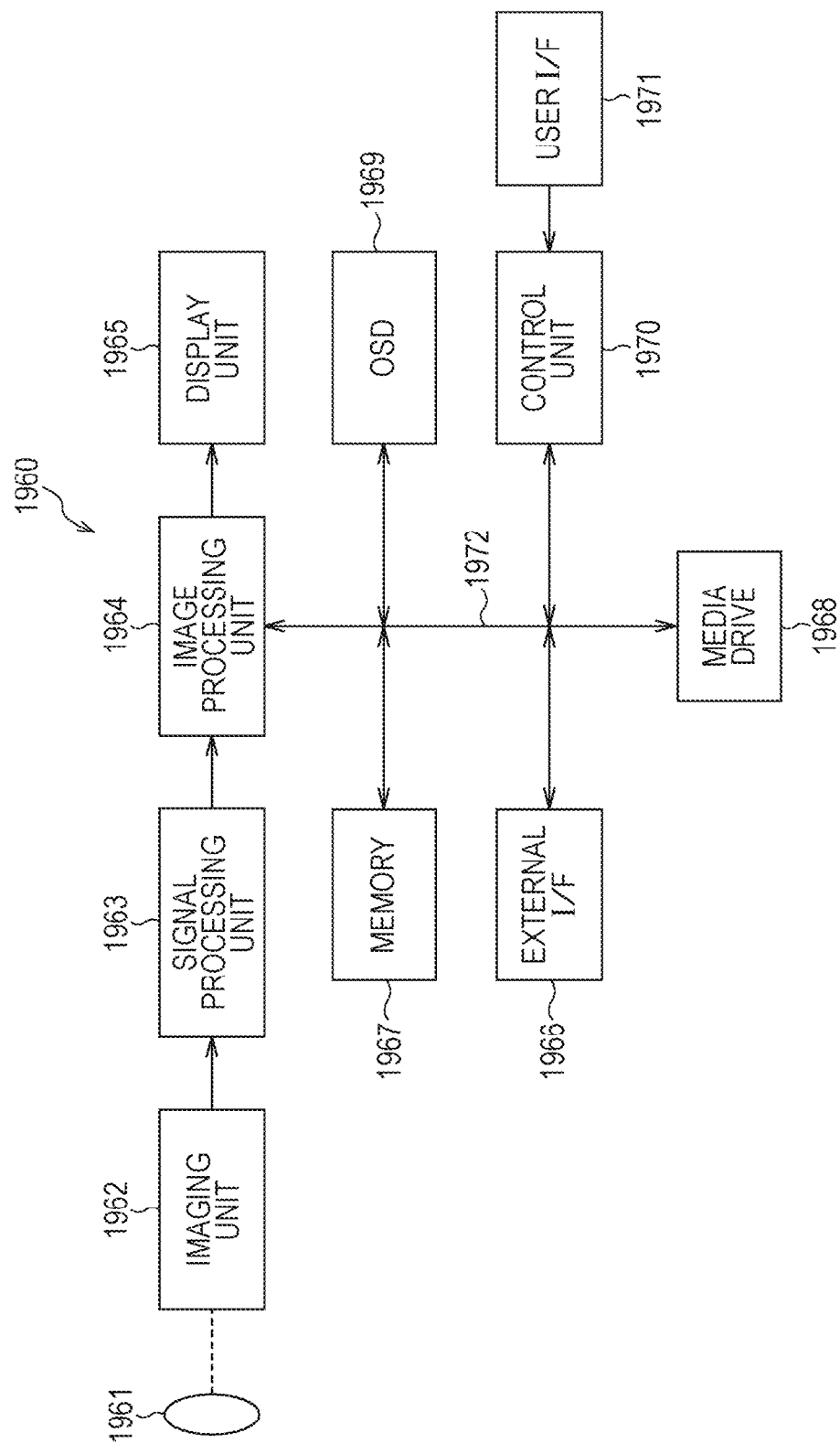
FIG. 27 is a block diagram that illustrates an example of the schematic configuration of an imaging apparatus.

FIG. 27 illustrates an example of the schematic configuration of an imaging apparatus to which the above-described embodiment is applied. The imaging apparatus 1960 images an object to generate an image, codes the image data, and records the coded image data on a recording medium.

The imaging apparatus 1960 includes an optical block 1961, an imaging unit 1962, a signal processing unit 1963, an image processing unit 1964, a display unit 1965, an external interface 1966, a memory 1967, a media drive 1968, an OSD 1969, a control unit 1970, a user interface 1971, and a bus 1972.

The optical block 1961 is connected to the imaging unit 1962. The imaging unit 1962 is connected to the signal processing unit 1963. The display unit 1965 is connected to the image processing unit 1964. The user interface 1971 is connected to the control unit 1970. The bus 1972 connects the image processing unit 1964, the external interface 1966, the memory 1967, the media drive 1968, the OSD 1969, and the control unit 1970 to each other.

The optical block 1961 includes a focus lens, a diaphragm mechanism, and the like. The optical block 1961 forms an optical image of the object on an imaging surface of the imaging unit 1962. The imaging unit 1962 includes an image sensor such as a CCD (Charge Coupled Device) and a CMOS (Complementary Metal Oxide Semiconductor) and converts the optical image formed on the imaging surface into an image signal as an electric signal through photoelectric conversion. Then, the imaging unit 1962 outputs the image signal to the signal processing unit 1963.

The signal processing unit 1963 performs various camera signal processes such as a knee correction, a gamma correction, and a color correction for the image signal input from the imaging unit 1962. The signal processing unit 1963 outputs the image data after the camera signal processes to the image processing unit 1964.

The image processing unit 1964 codes the image data input from the signal processing unit 1963 to generate coded data. Then, the image processing unit 1964 outputs the generated coded data to the external interface 1966 or the media drive 1968. In addition, the image processing unit 1964 decodes the coded data input from the external interface 1966 or the media drive 1968 to generate image data. Then, the image processing unit 1964 outputs the generated image data to the display unit 1965. In addition, the image processing unit 1964 may output the image data input from the signal processing unit 1963 to the display unit 1965 to display the image. Furthermore, the image processing unit 1964 may superimpose data for display that is acquired from the OSD 1969 on the image output to the display unit 1965.

The OSD 1969, for example, generates an image of a GUI such as a menu, a button, or a cursor and outputs the generated image to the image processing unit 1964.

The external interface 1966, for example, is configured as an USB input/output terminal. The external interface 1966, for example, connects the imaging apparatus 1960 and a printer when an image is printed. In addition, a drive is connected to the external interface 1966 as is necessary. A removable medium such as a magnetic disk or an optical disc is loaded into the drive, and a program read from the removable medium may be installed to the imaging apparatus 1960. Furthermore, the external interface 1966 may be configured as a network interface that is connected to a network such as a LAN, or the Internet. In other words, the external interface 1966 serves as a transmission unit of the imaging apparatus 1960.

The recording medium loaded into the media drive 1968, for example, may be an arbitrary readable/writable removable medium such as a magnetic disk, a magneto-optical disk, an optical disc, or a semiconductor memory. In addition, it may be configured such that a recording medium is fixedly mounted to the media drive 1968 to configure a non-portable storage unit such as a built-in hard disk drive or an SSD (Solid State Drive).

The control unit 1970 includes a processor such as a CPU and a memory such as a RAM or a ROM. The memory stores a program executed by the CPU, program data, and the like. The program stored in the memory is read by the CPU, for example, on activation of the imaging apparatus 1960 and is executed. The CPU controls the operation of the imaging apparatus 1960, for example, according to an operation signal input from the user interface 1971 by executing the program.

The user interface 1971 is connected to the control unit 1970. The user interface 1971, for example includes a button, a switch, and the like for a user to operate the imaging apparatus 1960. The user interface 1971 detects a user's operation through the constituent elements to generate an operation signal and outputs the generated operation signal to the control unit 1970.

In the imaging apparatus 1960 configured in this way, the image processing unit 1964 has the functions of the image coding apparatus and the image decoding apparatus according to the above-described embodiments. Accordingly, when an image is coded and decoded in the imaging apparatus 1960, the processing amount can be reduced.

In this specification, an example has been described in which various kinds of information such as the restriction identification information and the change identification information is multiplexed in the header of a coded stream and is transmitted from the coding side to the decoding side. However, a technique for transmitting such information is not limited to such an example. For example, such information may be transmitted or recorded as individual data associated with a coded bit stream without being multiplexed in the coded bit stream. Here, the term "associated" represents that an image (it may be a part of an image such as a slice, or a block) included in a bit stream and information corresponding to the image are acquired with being linked to each other at the time of decoding the image and the information. In other words, the information may be transmitted in a transmission line different from that of the image (or the bit stream). In addition, the information may be recorded on a recoding medium different from that for the image (or the bit stream) (or a different recording area of the same recording medium). Furthermore, the information and the image (or the bit stream), for example, may be associated with each other in units of arbitrary parts such as multiple frames, one frame, or a part of the frame.

While preferred embodiments of the present disclosure have been described in detail with reference to the accompanying drawings, the present disclosure is not limited to such examples. It is apparent that a person having ordinary knowledge in the technical field of the present disclosure can devise various changes or modifications within the scope of the technical idea described in the claims, and, naturally, it is understood that such changes and modifications belong to the technical scope of the present disclosure.

The present disclosure may take a configuration as below.

(1) An image processing device including:

a selection unit that selects a plurality of reference pictures having mutually-different reference picture types from reference pictures represented by reference picture specifying information included in a reference list based on restriction identification information identifying that the reference list that is a list of reference picture specifying information specifying reference pictures of a current picture is used commonly within the current picture; and a predicted image generating unit that generates a predicted image of the current picture based on a motion vector of a collocated picture of time different from that of the current picture and a reference picture of a same reference picture type as a reference picture type of the collocated picture among the plurality of reference pictures selected by the selection unit.

(2) The image processing device according to (1), wherein, in a case where the restriction identification information represents that the reference list is used commonly within the current picture, the selection unit selects the reference picture of the same reference picture type as the reference picture type of the current picture and the reference picture of a reference picture type different from the reference picture type of the current picture.

(3) The image processing device according to (2), wherein the selection unit selects the reference picture of the same reference picture type as the reference picture type of the current picture that is represented by the reference picture specifying information of which an index of the reference list is "0" and the reference picture of the reference picture type different from the reference picture type of the current picture that is represented by the reference picture specifying information of which an index of the reference list is other than "0".

(4) The image processing device according to (3), wherein the selection unit selects the reference picture of which the index is minimal among the reference pictures of the reference picture type different from the reference picture type of the current picture that is represented by the reference picture specifying information of which the index of the reference list is other than "0".

(5) The image processing device according to (4), wherein the selection unit, based on change identification information identifying that the reference list is changed, selects the reference picture of which the reference picture type is a Short-term that is represented by the reference picture specifying information of which the index of the reference list is "0" and the reference picture of which the reference picture type is a Long-term that is represented by the reference picture specifying information having the number of pieces of the reference picture specifying information of the reference pictures of which the reference picture type is the Short-term registered in the reference list as an index.

(6) The image processing device according to (5), wherein the change identification information is lists_modification_present_flag.

(7) The image processing device according to any of (1) to (6), wherein the reference picture type is a Long-term or a Short-term.

(8) The image processing device according to any of (1) to (7), wherein the restriction identification information is restricted_ref_pic_lists_flag.

(9) An image processing method using an image processing device, the image processing method including:

a selecting step of selecting a plurality of reference pictures having mutually-different reference picture types from reference pictures represented by reference picture specifying information included in a reference list based on restriction identification information identifying that the reference list that is a list of reference picture specifying information specifying reference pictures of a current picture is used commonly within the current picture; and a predicted image generating step of generating a predicted image of the current picture based on a motion vector of a collocated picture of time different from that of the current picture and a reference picture of a same reference picture type as a reference picture type of the collocated picture among the plurality of reference pictures selected in the process of the selecting step.

(10) An image processing device including:

a selection unit that selects a plurality of reference pictures having mutually-different reference picture types from reference pictures represented by reference picture specifying information included in a reference list based on change identification information identifying that the reference list that is a list of reference picture specifying information specifying reference pictures of a current picture is changed; and a predicted image generating unit that generates a predicted image of the current picture based on a motion vector of a collocated picture of time different from that of the current picture and a reference picture of a same reference picture type as a reference picture type of the collocated picture among the plurality of reference pictures selected by the selection unit.

(11) The image processing device according to (10), wherein, in a case where the change identification information represents that the reference list has not been changed, the selection unit selects the reference picture of which the reference picture type is a Short-term that is represented by the reference picture specifying information of which an index of the reference list is "0" and the reference picture of which the reference picture type is a Long-term that is represented by the reference picture specifying information having the number of pieces of the reference picture specifying information of the reference pictures of which the reference picture type is a Short-term registered in the reference list as an index.

(12) The image processing device according to (11), wherein the selection unit, in a case where the reference picture specifying information of the reference pictures of which the reference picture type is a Short-term and the reference pictures of which the reference picture type is a Long-term is registered in the reference list, selects the reference picture of which the reference picture type is the Short-term that is represented by the reference picture specifying information of which the index of the reference list is "0" and the reference picture of which the reference picture type is the Long-term that is represented by the reference picture specifying information having the number of pieces of the reference picture specifying information of the reference pictures of which the reference picture type is the Short-term registered in the reference list as an index.

(13) An image processing method using an image processing device, the image processing method including:

a selecting step of selecting a plurality of reference pictures having mutually-different reference picture types from reference pictures represented by reference picture specifying information included in a reference list based on change identification information identifying that the reference list that is a list of reference picture specifying information specifying reference pictures of a current picture is changed; and a predicted image generating step of generating a predicted image of the current picture based on a motion vector of a collocated picture of time different from that of the current picture and a reference picture of a same reference picture type as a reference picture type of the collocated picture among the plurality of reference pictures selected in the process of the selecting step.

REFERENCE SIGNS LIST

1000 Image coding apparatus
1032 Selection unit
1034 Predicted image generating unit
1100 Image decoding apparatus
1152 Selection unit
1154 Predicted image generating unit
1300 Image coding apparatus
1322 Selection unit
1400 Image decoding apparatus
1422 Selection unit

The invention claimed is:

1. An image processing device comprising:
a selection unit that:
searches for a minimum value of an index of a reference picture type different from the reference picture type of a current picture in units of pictures; and
selects a plurality of reference pictures having mutually-different reference picture types from reference pictures represented by reference picture specifying information included in a reference list,
wherein the reference list is a list of reference picture specifying information specifying reference pictures of the current picture, and
wherein said selecting the plurality of reference pictures is performed only if the reference list is used commonly by all slices within the current picture; and
a predicted image generating unit that generates a predicted image of the current picture based on a motion vector of a collocated picture of time different from that of the current picture and a reference picture of a same reference picture type as a reference picture type of the collocated picture among the plurality of reference pictures selected by the selection unit.

2. The image processing device according to claim 1, wherein, in a case where the reference list is used commonly by all slices within the current picture, the selection unit selects the reference picture of the same reference picture type as the reference picture type of the current picture and the reference picture of a reference picture type different from the reference picture type of the current picture.

3. The image processing device according to claim 2, wherein the selection unit selects the reference picture of the same reference picture type as the reference picture type of the current picture that is represented by the reference picture specifying information of which an index of the reference list is "0" and the reference picture of the reference picture type different from the reference picture type of the current picture that is represented by the reference picture specifying information of which an index of the reference list is other than "0".

4. The image processing device according to claim 3, wherein the selection unit selects the reference picture of which the index is minimal among the reference pictures of the reference picture type different from the reference picture type of the current picture that is represented by the reference picture specifying information of which the index of the reference list is other than "0".

5. The image processing device according to claim 1, wherein the reference picture type is a Long-term or a Short-term.

6. The image processing device according to claim 1, wherein restricted_ref_pic_lists_flag is used for identifying whether the reference list is used commonly by all slices within the current picture.

7. An image processing method using an image processing device, the image processing method comprising:
a selecting step of:
searching for a minimum value of an index of a reference picture type different from the reference picture type of a current picture in units of pictures; and
selecting a plurality of reference pictures having mutually-different reference picture types from reference pictures represented by reference picture specifying information included in a reference list,
wherein the reference list is a list of reference picture specifying information specifying reference pictures of the current picture, and
wherein said selecting the plurality of reference pictures is performed only if the reference list is used commonly by all slices within the current picture; and
a predicted image generating step of generating a predicted image of the current picture based on a motion vector of a collocated picture of time different from that of the current picture and a reference picture of a same reference picture type as a reference picture type of the collocated picture among the plurality of reference pictures selected in the process of the selecting step.

* * * * *